(12) United States Patent
Porter et al.

(10) Patent No.: US 10,649,446 B2
(45) Date of Patent: May 12, 2020

(54) TECHNIQUES FOR CONVEYANCE DEVICE CONTROL

(71) Applicant: Amazon Technologies, Inc., Seattle, WA (US)

(72) Inventors: Brandon William Porter, Yarrow Point, WA (US); Jon Stuart Battles, North Bend, WA (US); William George Bowes, Kirkland, WA (US); David Henry Clark, Seattle, WA (US); Scott Dresser, Boxborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 15/967,359

(22) Filed: Apr. 30, 2018

(65) Prior Publication Data
US 2019/0332096 A1    Oct. 31, 2019

(51) Int. Cl.
*G05B 19/418*    (2006.01)
*G05D 1/02*    (2020.01)
(Continued)

(52) U.S. Cl.
CPC ..... *G05B 19/41895* (2013.01); *B65G 1/0492* (2013.01); *B65G 1/065* (2013.01); *G05B 19/402* (2013.01); *G05B 19/4182* (2013.01); *G05D 1/0234* (2013.01); *G06Q 10/087* (2013.01); *G05B 2219/39102* (2013.01); *G05B 2219/40298* (2013.01); *G05B 2219/45134* (2013.01); *G05B 2219/50393* (2013.01); *G05D 2201/0216* (2013.01)

(58) Field of Classification Search
CPC ................................. G05B 19/41895
See application file for complete search history.

(56) References Cited

U.S. PATENT DOCUMENTS 8,280,547 B2    10/2012  D'Andrea et al.
8,918,202 B2 *  12/2014  Kawano ............... G05D 1/0234
                                      700/213
(Continued)

OTHER PUBLICATIONS

PCT/US2019/028191, "International Search Report and Written Opinion", dated Jul. 16, 2019, 9 pages.

*Primary Examiner* — Thomas Randazzo
(74) *Attorney, Agent, or Firm* — Kilpatrick Townsend & Stockton LLP

(57) ABSTRACT

Systems and methods are provided herein for operating a conveyance system (e.g., a conveyor belt, tilt plane, robotic arm) of a mobile drive unit (MDU) independent of the MDU's navigation system. The MDU may be configured to obtain, convey, and deliver items within the workspace. Navigation information related to navigating the MDU within a workspace may be obtained. Operations of a navigational system of the MDU may be performed to move the MDU to various locations within the workspace in accordance with the navigation information. Conveyance information related to physically obtaining and/or delivering an item within the workspace may be obtained by the MDU (e.g., via conveyance-related fiducial markers and/or sensors of the MDU). At least one operation of a conveyance system of the MDU may be executed which may cause the item to be physically relocated based at least in part on the conveyance information.

20 Claims, 10 Drawing Sheets

(51) Int. Cl.
  *B65G 1/06*   (2006.01)
  *B65G 1/04*   (2006.01)
  *G05B 19/402* (2006.01)
  *G06Q 10/08*  (2012.01)

(56) References Cited

U.S. PATENT DOCUMENTS

| | | | |
|---|---|---|---|
| 9,087,314 | B2 | 7/2015 | Hoffman et al. |
| 9,152,149 | B1* | 10/2015 | Palamarchuk ........ G05D 1/0234 |
| 9,487,356 | B1 | 11/2016 | Aggarwal |
| 9,785,911 | B2* | 10/2017 | Galluzzo .................. B25J 5/007 |
| 9,827,683 | B1* | 11/2017 | Hance ..................... B25J 19/023 |
| 10,214,354 | B2* | 2/2019 | Toebes ................. G06Q 10/087 |
| 2011/0010023 | A1* | 1/2011 | Kunzig ..................... G01S 5/16 701/2 |
| 2016/0107838 | A1* | 4/2016 | Swinkels ............. B65G 1/0492 414/273 |
| 2016/0145045 | A1* | 5/2016 | Mountz ................ B65G 1/1378 700/216 |
| 2016/0167227 | A1 | 6/2016 | Wellman et al. |
| 2016/0176638 | A1* | 6/2016 | Toebes ................. G06Q 10/087 700/216 |
| 2018/0082162 | A1* | 3/2018 | Durham ................. G06Q 50/28 |
| 2018/0088586 | A1* | 3/2018 | Hance ................... G05D 1/0236 |
| 2018/0113475 | A1* | 4/2018 | Brazeau ............... G05D 1/0297 |
| 2018/0136669 | A1* | 5/2018 | Turpin ................. G05D 1/0088 |
| 2018/0319594 | A1* | 11/2018 | Blevins ................. B66F 17/003 |
| 2019/0168394 | A1* | 6/2019 | Bidram ................ B25J 15/0206 |
| 2019/0179329 | A1* | 6/2019 | Keivan ................. G05D 1/0214 |

* cited by examiner

TECHNIQUES FOR CONVEYANCE DEVICE CONTROL

BACKGROUND

Modern inventory systems, such as those in storage and/or sortation facilities (e.g., a warehouse, sortation warehouse) face significant challenges with respect to managing items in inventory. Items may be moved from one location to another within a facility. While storing items within a facility and retrieving items for order fulfillment were once traditionally accomplished by human personnel, it is becoming more common for these functions to be performed by a myriad of robotic devices (e.g., mobile drive units (MDUs)). These devices may be equipped with any number of conveyance devices (e.g., conveyor belts, tilt planes, robotic arms, etc.). Traditionally, such conveyance devices are operated as part of a management system that also controls the navigation of the MDUs.

BRIEF DESCRIPTION OF THE DRAWINGS

Various embodiments in accordance with the present disclosure will be described with reference to the drawings, in which.

DETAILED DESCRIPTION

Figure 1:
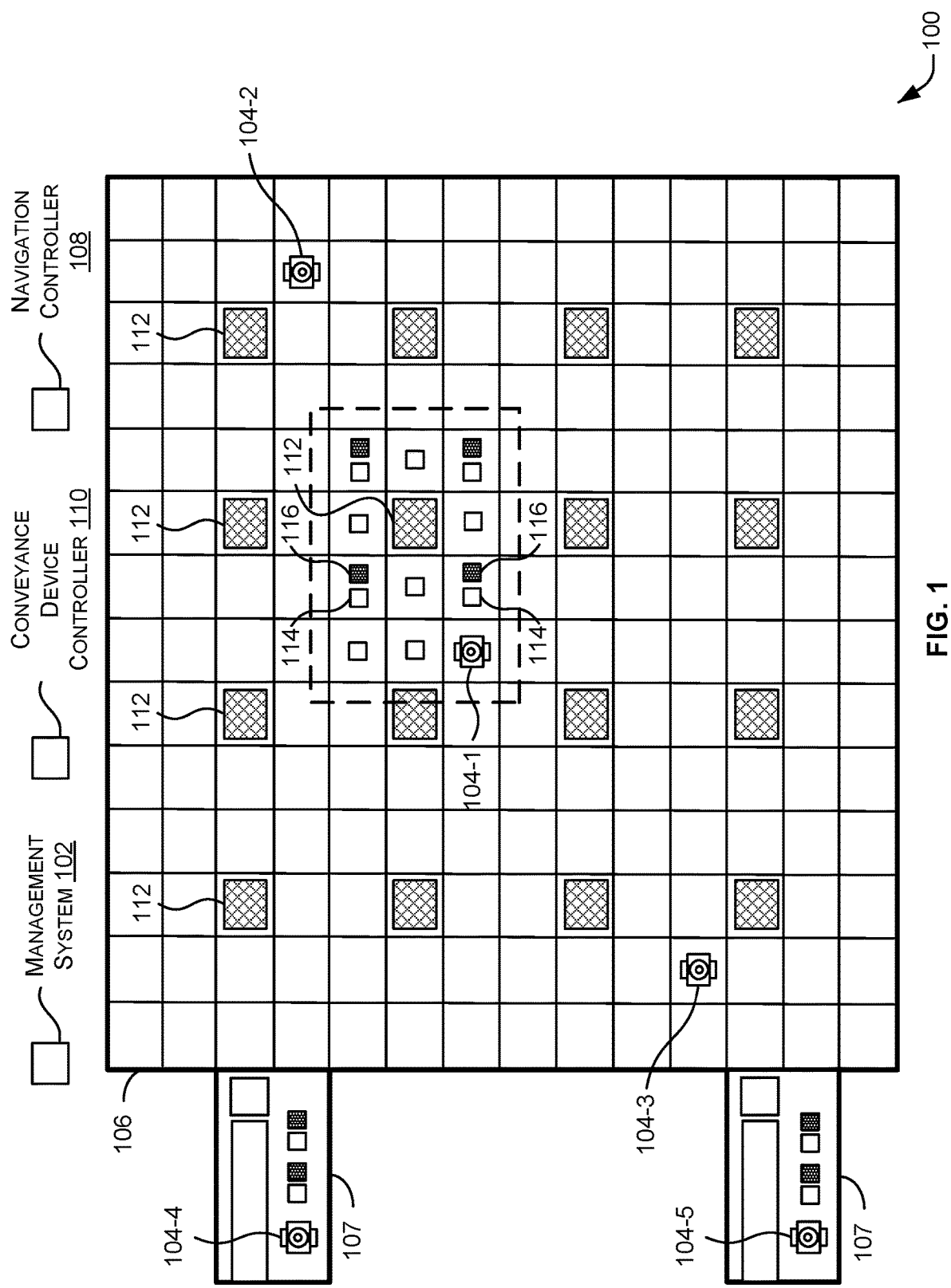
FIG. 1 is a schematic diagram illustrating an example environment suitable for implementing aspects of a conveyance device controller, in accordance with at least one embodiment.

Techniques described herein are directed to systems and methods for controlling one or more conveyance devices mounted to a mobile drive unit (MDU) operating within a workspace (e.g., a facility). Conventional conveyance devices may be operated as part of a management system that also controls the navigation of mobile drive units (MDUs). Such techniques can produce performance inefficiencies due to computing both navigational/guidance instructions of the MDUs as well as conveyance instructions related to obtaining and/or delivering an item. Accordingly, current techniques may lead to delays in task completion that may negatively affect the performance of the MDUs operating in the facility individually, or as a whole. Thus, improvements are needed to address such inefficiencies. Additionally, by utilizing the disclosed techniques, conveyance (e.g., obtaining an item, delivering an item, etc.) can be more efficiently coordinated with the navigation (e.g., movement) of the MDU such that conveyance of an item does not impact the motion of the MDU. Embodiments of the invention address these and other problems, individually and collectively.

Although examples throughout may utilize workspaces that may include storage facilities (e.g., warehouses), sortation facilities (e.g., sortation warehouses), and/or warehouse machinery for illustrative purposes, it should be appreciated that any example herein may be equally applied to other suitable contexts such as facilities in which storage and/or sortation is not a focus. A "conveyance device controller" may be utilized in various examples herein. A "conveyance device controller" may be a computing system, a device, a hardware module, or a software module, responsible for controlling operations of one or more conveyance devices (e.g., a conveyor belt, a tilt plane, a lift platform, a robotic arm, etc.) that may be mounted or otherwise attached to an MDU. An "item" may include any suitable physical object(s) (e.g., an item or items that may be purchased from an online retailer and stored and/or sorted within a facility). It should be understood that any example provided herein that refers to a conveyance device and/or an item singularly, can similarly be applied in contexts in which there are multiple conveyance devices and/or items. In the examples herein, a "fiducial marker" in either a navigation-related context or a conveyance-related context may be in any suitable form (e.g., physical markers and/or electronic data) from which navigation information and/or conveyance information may be ascertained or provided.

In some examples, an MDU may be assigned a task that may correspond to various plannable activities (e.g., obtain an item, carry an item, deliver an item, etc.) to be performed by the MDU within the workspace. The task may be assigned by a management module that is external (or internal) with respect to the MDU. The management module may manage the navigational/guidance instructions related to planned execution paths and/or tasks for the MDUs operating within the workspace. As a simplistic example, the management module may provide instructions to the MDU for performing an assigned task (e.g., fetch item X from location Z and deliver item X to location Q). In some examples, the instructions may specify that the MDU is to take action (e.g., eject item) when it encounters a particular location and/or fiducial marker (e.g., navigation-related and/or conveyance-related). When corresponding instructions are executed by a respective MDU, the MDU may perform the task. In some embodiments, the MDU may be configured with a sensor (or more than one sensor) for determining a location of the MDU within the workspace. By way of example, the MDU may be configured with a bar code reader, an infrared sensor, an image capture device, a global positioning system, or the like that may be used to ascertain the location of the MDU within the workspace. In some embodiments, the sensor may be used to read navigational-related fiducial markers located throughout the workspace.

As a non-limiting example, a bar code reader may be positioned to read navigational-related fiducial markers placed in various locations on the floor of the workspace. A "navigational fiducial marker," as used herein, is intended to refer to any suitable form (e.g., physical and/or electronic data) from which navigational information is ascertainable and/or provided (e.g., stickers, reference points, other objects in the workspace, RFID, positional data such as GPS coordinates, etc.) from which location information for the MDU may be ascertained.

An MDU may be assigned a task (e.g., by the management system) that includes conveyance activities such as obtaining an item from a location, conveying the item from one location to another, and/or delivering the item to location. While navigation and/or guidance of the MDU (e.g., movement of the MDU) may be conducted with the management system and the navigational fiducial markers, the conveyance activities may be performed independently. For example, the sensor of the MDU may be further configured to obtain conveyance information from conveyance-related fiducial markers. Conveyance information may include any suitable combination of item information related to the item (e.g., weight, dimensions, material, etc.), shipping information (e.g., a shipping address, a zip code, etc.), a delivery location within the workspace, a specific location at which to engage the conveyance device, a speed at which to engage to the conveyance device, an angle at which to tilt to the conveyance device, or any suitable instructions for operating the conveyance device (e.g., to obtain, convey, or deliver at item). Conveyance-related fiducial markers may be statically provided physical markers (e.g., a bar code, text on a label, etc.) or in some cases, the conveyance-related fiducial markers may be dynamically updated. For example, a conveyance-related fiducial marker could be provided via a display screen. The MDU may capture an image of the screen and ascertain the conveyance information using image recognition techniques. In some embodiments, a conveyance-related fiducial marker may be in any suitable form (e.g., physical and/or electronic data) from which conveyance information is ascertainable and/or provided.

As a non-limiting example, an MDU configured with a conveyor device (e.g., a conveyor belt, a tiltable plane, liftable platform, a robotic arm, etc.) may receive instructions from the management system to navigate (e.g., utilizing navigational-related fiducial markers, GPS, etc.) to an area from which an item is to be obtained. The MDU may be instructed to approach a pickup location. As the MDU approaches the pickup location, the MDU may pass by (e.g., over) a conveyance-related fiducial marker. The conveyance-related fiducial marker may include any suitable information with which operations of the conveyance device may be determined. As the MDU passes the pickup location, the item may be transferred from the pickup location to the MDU by the conveyance device. In some scenarios, the MDU may cause the transfer of the item utilizing the conveyance device without stopping at the pickup location.

In some cases, the MDU may be instructed by the management system to proceed to a delivery location. As the MDU approaches the delivery location, the MDU may pass by a single conveyance-related fiducial marker that indicates that the conveyance device is to perform particular operations in order to deliver the item to the delivery location. Alternatively, the management system may provide instructions that indicate that the MDU is to deliver the item in a particular manner once a particular location and/or conveyance-related fiducial marker is encountered by the MDU. For example, the conveyance-related fiducial marker may provide conveyance information that may be utilized by a conveyance controller of the MDU to operate the conveyance device. By way of example, the conveyance controller may receive conveyance information that causes the conveyance controller to actuate a conveyor belt on the MDU at a particular speed and toward a particular direction (e.g., toward the delivery location).

In other examples, the MDU may pass by multiple conveyance-related fiducial markers that may be collectively utilized to determine operations to be performed by the conveyance device. By way of example, the MDU may pass by a first conveyance-related fiducial marker to obtain first conveyance information. The first conveyance information may indicate a first location, and/or a particular distance between the first conveyance-related fiducial marker and the delivery location, and/or at a particular relative location (e.g., ahead of the MDU, immediately on the left). The MDU may then pass by a second conveyance-related fiducial marker to obtain second conveyance information. The second conveyance information may indicate a second location, and/or a particular distance between the second conveyance-related fiducial marker and the delivery location, and/or at a particular relative location (e.g., ahead of the MDU, immediately on the left). In some embodiments, a conveyance controller of the MDU that is configured to operate the conveyance device may determine from the first conveyance information and the second conveyance information operations to be performed by the conveyance device. The conveyance controller may then instruct the conveyance device to perform those operations resulting in the delivery of the item to the delivery location. As a non-limiting example, the conveyance controller may calculate a speed of the MDU from the first and second conveyance information such that the conveyance device (e.g., a conveyor belt) operates in the applicable direction (e.g., projecting an item toward the delivery location) at an appropriate speed (e.g., given the determined speed that the MDU is travelling) such that the item is delivered to the location without modifying the travelling speed of the MDU.

In some embodiments, item information and/or delivery information associated with the item to be conveyed may be provided and/or ascertained from conveyance information provided by a conveyance-related fiducial marker. By way of example, item information such as an identifier, a weight, a material, item dimensions, an item category (e.g., hazardous, fragile, etc.) may be included in the conveyance information provided by the conveyance-related fiducial marker. Similarly, delivery information such as a shipping address, a delivery zip code, a delivery location within the workspace, or the like may be included in the conveyance information provided by the conveyance-related fiducial marker. In some cases, an identifier for the item may be provided by the conveyance-related fiducial marker and the conveyance controller may be configured to request (e.g., via a wireless protocol) item information and/or delivery information from the management system and/or any suitable system (e.g., an inventory database system that contains information for any suitable number of items including the item being conveyed). In some embodiments, the MDU and/or the conveyance device may be configured with one or more sensor(s) (e.g., an image capture device, a load cell, accelerometers, gyroscopes, etc.) for sensing item information (e.g., weight, dimensions, orientation, or the like) of the item.

The conveyance device controller may be configured to operate the conveyance device according to the specific item information for the item. In other words, the speed, tilt, duration and/or direction of movement, or other operating parameters of the conveyance device may vary based on the item being obtained, conveyed, and/or delivered. By way of example, an item that is relatively large and/or heavy and/or has different packaging (e.g., corrugate vs. mailers), may be transferred from the conveyance device using different operations than the operations used to transfer an item that is relatively small and/or light.

In another exemplary embodiment, the MDU may be configured with one or more conveyance device(s) with individual conveyance device controllers (or a shared controller). Any suitable number of the conveyance devices of an MDU may be configured to transport one or more items. In any of the examples provided herein, a conveyance device may be configured to transport one or more items. Accordingly, a conveyance device may be configured with sensors that may be utilized by the conveyance device controller(s) to identify a particular item to be conveyed. For example, the MDU may be carrying two items in a storage bin accessible to a robotic arm. As another example, the MDU may be configured with two conveyor belts that may individually transport one or more items. The conveyance device controller, upon receiving conveyance information may utilize any suitable sensor information (e.g., images, infrared, RFID, bar codes, pressure sensors, and the like) to identify the location of a particular item in order to select the appropriate item from a group of items.

Unlike conventional systems where a single management system controls the navigation/guidance of the MDU as well as the instructions for operating a conveyance device of the MDU, the operations of the conveyance device may be determined locally at the MDU. This can alleviate the processing burden of the management system by decoupling the operations of the conveyance device from the navigation of the MDU. The conveyance of the item may be controlled locally at the MDU rather than by the management system. Furthermore, the operations instructed by the management system may be synchronized with operations performed by the conveyance device. Still further, the techniques described herein can improve efficiency of the MDUs within the workspace as items may be obtained and delivered without causing the speed at which the MDU is travelling to change. Accordingly, the conveyance controller can improve the overall system throughput (e.g., reducing wait times of MDUs in the system). It should be appreciated that the techniques discussed above are applicable in contexts other that inventory/sortation situations.

FIG. 1 is a schematic diagram illustrating an example environment 100 suitable for implementing aspects of a conveyance device controller, in accordance with at least one embodiment. The environment 100 may include a management module 102 and one or more mobile drive units (MDUs) (e.g., the MDUs 104-1, 104-2, 104-3, 104-4, 104-5, collectively referred to as "MDUs 104") operating within a workspace 106 (e.g., a warehouse facility where items are stored, a sortation facility where items are sorted, or the like).

The management module 102 may be configured to manage various task assignments and navigational aspects of the MDUs 104 with the workspace 106. Each of the MDUs 104 may be configured with a navigation controller 108 and a conveyance device controller 110. The MDUs 104 may individually be configured with multiple conveyance device controllers that are each specific to a conveyance device of the MDU. It should be appreciated that the navigation controller 108 and the conveyance device controller 110 may be separate modules/devices or some operations of the navigation controller 108 and the conveyance device controller 110 may be performed by a single module/device. The navigation controller 108 may be configured to receive task assignment information and navigational/guidance instructions from the management module 102 to move the MDU within the workspace 106. The conveyance device controller 110 of each MDU may be configured to perform conveyance operations using a conveyance device (e.g., a conveyor belt, tilt plane, lift platform robotic arm, etc.) mounted to the respective MDU 104. Additional elements within the workspace 106 may include one or more of the receptacles 112. In some embodiments, the workspace 106 may include transfer areas 107 where items may be obtained by the MDUs 104 and conveyed to various delivery locations (e.g., receptacles 112). The workspace 106 may include additional elements and/or components not depicted in FIG. 1.

The receptacles 112 may be in various forms. By way of example only, the receptacles 112 may be in any suitable form and configured to receive one or more items. Some of the receptacles 112 may include storage locations and/or containers configured to receive and store one or more physical items. For example, the receptacles 112 may include bins, shelves, racks, or the like. In some embodiments, the receptacles 112 may include an opening through which items may be deposited (and potentially transported or directed) to a storage container (e.g., a portable storage container, a stationary storage container, etc.).

As a non-limiting example, the workspace 106 may include an elevated floor upon which the MDUs 104 may operate. The receptacles 112 may include an opening within the elevated floor of workspace 106 through which items may be deposited by the MDUs 104. In some examples, the floor may or may not be elevated and the receptacles 112 may include an opening (e.g., directed upward or downward) through which items may be deposited. Storage containers (not depicted) may be placed near to (e.g., below, above, etc.), or may otherwise be attached to, the receptacles 112. An item may be deposited into the receptacles 112 and transported (e.g., via a shoot, a conveyor belt, another MDU/transportation device, or the like) to a storage container (e.g., a bin, a crate, a vehicle, or the like). The storage container may store the item on a temporary or permanent basis. Each of the receptacles 112 may be associated with an identifier that identifies a particular receptacle from the group.

As another non-limiting example, the receptacles 112 may include a storage container on which one or more items may be placed for storage. The receptacles 112 may be a shelving system and/or a storage container having any suitable number of storage containers within which the MDUs 104 may place various items. Each storage container within the receptacles 112 may be associated with an identifier that identifies the particular storage container within the receptacles 112.

In some embodiments, the MDUs may transport any item (e.g., a physical item, the receptacles 112, etc.) between locations within the workspace 106. Accordingly, each of the MDUs 104 may be capable of moving items between locations within the workspace 106 to facilitate the entry, processing, sortation, storage management, and/or removal of items within the workspace 106 and the completion of other tasks involving items.

In at least one embodiment, the management module 102 may assign tasks to appropriate components of workspace 106 (e.g., the MDUs 104) and coordinate operation of the various components in completing the tasks. Although shown in FIG. 1 as a single, discrete component, the management module 102 depicted may represent multiple components and may represent or include portions of the MDUs 104 or other components of the environment 100 (e.g., one or more components of the navigation controller 108). The management module 102 may be internal or external to the workspace 106. In some examples, the management module 102 may be communicatively connected to various components of the environment 100 (e.g., the navigation controller 108 and/or the conveyance device controller 110) via one or more networks (e.g., the Internet, a wireless network, a local area network, a cellular network, or the like).

The MDUs 104 may represent any devices or components appropriate for use in the workspace 106 based on the characteristics and configuration of the receptacles 112 and/or other components of workspace 106. In a particular embodiment of environment 100, the MDUs 104 represent independent, self-powered devices configured to freely move about the workspace 106. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. The MDUs 104 may be communicatively coupled to the management module 102 via any suitable communication means and according to any suitable communications protocol. It should be appreciated that the examples described herein, may similarly be utilized by any suitable device that is configured to utilize space to move, regardless of whether or not it is able to freely move about the workspace 106. Thus, the techniques herein may equally be applied to devices other than MDUs, such as robotic arms, for example.

The workspace 106 of FIG. 1 represents an area within which the MDUs 104 can move. For example, the workspace 106 may represent all or part of the floor of a mail-order warehouse and/or a sortation facility in which the MDUs 104 operate. Although FIG. 1 shows, for the purposes of illustration, a workspace 106 that includes a fixed, predetermined, and finite physical space, the workspace 106 may have variable dimensions and/or an arbitrary geometry. While FIG. 1 is intended to illustrate a particular embodiment in which the workspace 106 is entirely enclosed in a building, the workspace 106 may be unconstrained by any fixed structure.

In operation, the management module 102 may select particular MDUs of the MDUs 104 to perform particular tasks. Once a task (or many tasks) are assigned, the management module 102 may provide instructions to the navigation controller 108. A task and instructions may include one or more sub-tasks. By way of example only, a task of storing a newly received item may include navigating to a particular location (e.g., transfer area 107, a particular receptacle of the receptacles 112, etc.) and travelling (e.g., along a planned path) to another location (e.g., another area of the workspace 106, one of the receptacles 112, etc.).

The MDUs 104 may be configured to receive task assignments (e.g., from the management module 102 directly, or indirectly via, for example, the navigation controller 108). The MDUs 104 may transmit instruction requests (e.g., to the management module 102) and receive instruction responses (e.g., from the management module 102). An instruction request may include location information associated with a particular MDU such as a location identifier indicating a current location of the MDU. An instruction response may include information that instructs the MDU to perform particular operations (e.g., begin traveling along a particular heading at a particular speed). The management module 102 may be configured to manage space reservation to the MDUs 104 within the workspace 106. In some embodiments, the management module 102 may reserve space (e.g., a volume, an area, a location, etc.) within the workspace 106 for a particular MDU to execute some suitable portion of its assigned task.

In some embodiments, the workspace 106 may employ navigation-related fiducial markers 114 that are placed within the workspace 106. The navigation-related fiducial markers 114 can be embedded in a concrete floor of the workspace 106, or alternatively in a raised floor or supplemental surface disposed over an existing floor surface. The navigation-related fiducial markers 114 can be distributed (e.g., in a grid-like pattern, in any suitable manner) throughout the workspace 106 and may encode location information via any suitable method (e.g., a location identifier encoded in a bar code, a QR code, MaxiCode, Data Matrix, EZ Code, or any suitable identifying tag or code may be employed, encoded or not.

As the MDUs 104 travel about the workspace 106, The MDUs 104 may be configured to obtain location information (e.g., via a sensor such as a bar code reader, a scanner, an image capture device, etc.) from the navigation-related fiducial markers 114. The MDUs 104 may provide current location, current state, and/or other characteristics of the MDUs 104 to the management module 102 to provide updated awareness of the tasks and location of the MDUs 104. In some embodiments, an MDU may provide this information periodically and/or incrementally to notify the management module 102 of its location and/or a completion or delay associated with a portion of its assigned task. The management module 102 may utilize the information provided by the MDUs 104 to determine and/or modify planned navigation paths, update task assignment, or any suitable operation related to task assignment and navigation of the MDUs 104 within the workspace 106. In some embodiments, the MDUs 104 may ascertain location information without utilizing navigation-related fiducial markers. For example, the MDUs 104 may additionally or alternatively utilize a global positioning system, image recognition techniques (e.g., identifying location through images via objects and/or references points, etc.), or the like to ascertain location information.

In some embodiments, the management module 102 in concert with a respective navigation controller 108 may coordinate the motion of an MDU utilizing location information obtained via navigation-related fiducial markers.

In some embodiments, the workspace 106 may employ conveyance-related fiducial markers 116 that are placed within the workspace 106. The conveyance-related fiducial markers 116 can be separate from the navigation-related fiducial markers, or in some cases, a fiducial marker can include both location information and conveyance information. Conveyance-related fiducial markers can be embedded in a concrete floor of the workspace 106, or alternatively in a raised floor or supplemental surface disposed over an existing floor surface. The conveyance-related fiducial markers 116 can be distributed as depicted at particular locations throughout the workspace 106. It should be appreciated that more or fewer conveyance-related fiducial markers may be employed in any suitable configuration. For example, conveyance-related fiducial markers may be placed near some/or all receptacles 112. One or more conveyance-related fiducial markers may correspond to a single receptacle. That is, there may be one or more conveyance-related fiducial markers placed in such a manner as to correspond to one or more approach directions.

In some embodiments, conveyance-related fiducial markers may encode conveyance information via any suitable method (e.g., a location identifier encoded in a bar code, a QR code, MaxiCode, Data Matrix, EZ Code, or any suitable text and/or code may be employed, encoded or not.

By way of example, conveyance information may include and suitable combination of the following: item information related to the item (e.g., weight, dimensions, material, etc.), shipping information (e.g., a shipping address, a zip code, etc.), a delivery location and/or a particular receptacle within the workspace, a specific location (e.g., a particular conveyance-related fiducial marker) at which to engage the conveyance device, a speed at which to engage the conveyance device, a duration for which the conveyance-related device is to be operated, an angle of tilt/an elevation to be achieved by the conveyance device, a distance between a conveyance-related fiducial marker and a delivery location or receptacle, an orientation of a particular receptacle with respect to a particular conveyance-related fiducial marker, an angle at which to tilt to the conveyance device, or any suitable instructions and/or information for operating the conveyance device to obtain or deliver at item.

In some embodiments, the conveyance device controller 110 may be configured to determine a set of operations to be performed by a conveyance device mounted to an MDU. For example, the conveyance device controller 110 may be configured to utilize conveyance information to determine particular operations to be performed by a conveyance device in order to obtain an item from a location and/or to deliver an item to a location. The conveyance device controller 110 may instruct the conveyance device to perform any suitable operation. Specific examples of conveyance device operations will be discussed further below in connection with the following figures.

Figure 2A:
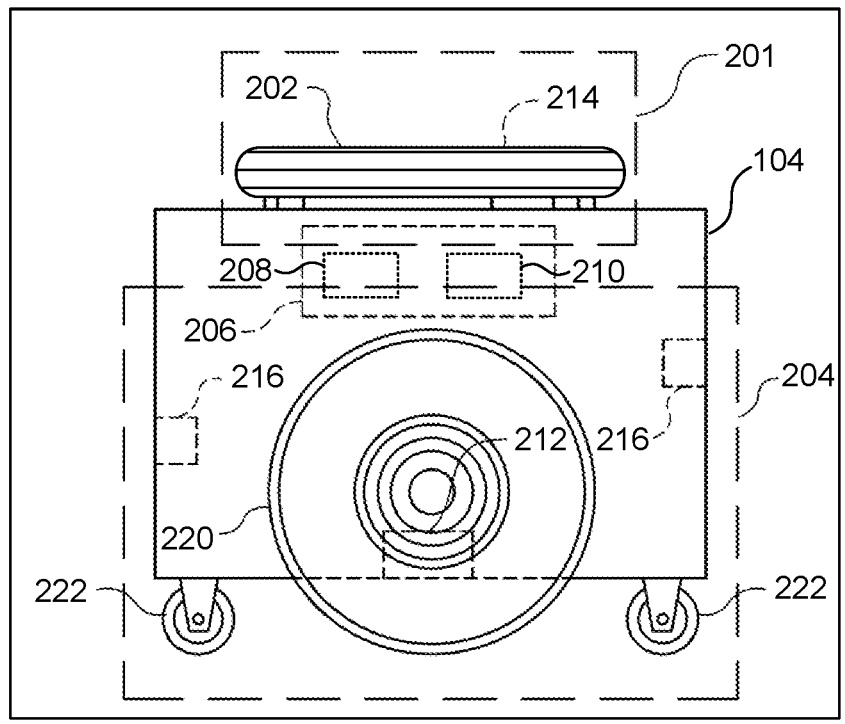
FIGS. 2A and 2B illustrate in greater detail an example mobile drive unit that may be utilized in particular embodiments of the inventory system shown in FIG. 1.
Figure 2B:
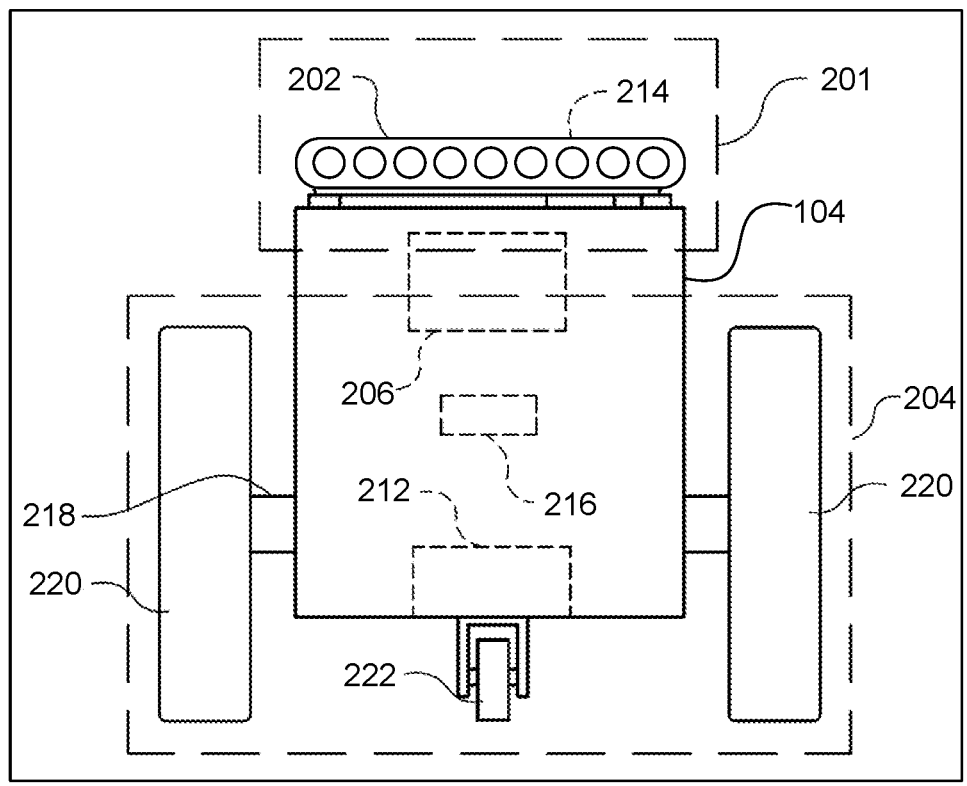

FIGS. 2A and 2B illustrate in greater detail the components of a particular embodiment of a mobile drive unit (e.g., the mobile drive unit (MDU) 104 of FIG. 1). In particular, FIGS. 2 and 3 include a front and side view of the MDU 104. The MDU 104 may include a conveyance system 201 (including a conveyance device 202 and, in some cases, sensor(s) 214), a drive module 204, and a control module 206. The control module 206 may include navigation controller 208 (an example of the navigation controller 108 of FIG. 1) for controlling guidance/navigation of the MDU 104 and a conveyance device controller 210 (an example of the conveyance device controller 110 of FIG. 1) for controlling operations performed by the conveyance device 202. Additionally, the MDU 104 may include one or more sensors configured to detect or determine the location of the MDU 104, to obtain item information and/or delivery information, to obtain conveyance information, or any suitable information related to navigating and/or conveying an item with a workspace. In the illustrated embodiment, the MDU 104 includes sensor(s) 212 (e.g., a scanner), sensor(s) 214 (e.g., a load cell), and sensor(s) 216 (e.g., optical sensors, image capturing devices, etc.).

The drive module 204 may propel the MDU 104. The drive module 204 may represent any appropriate collection of components operable to propel the MDU 104. For example, in the illustrated embodiment, the drive module 204 includes a motorized axle 218, a pair of motorized wheels 220, and a pair of stabilizing wheels 222. Each of the motorized wheels 220 may be located at each end of the motorized axle 218, and one stabilizing wheel 222 may be positioned at each end of the MDU 104.

The conveyance device 202 may be any suitable device such as a conveyor belt, a tilt plane, a lift platform, a robotic arm, or any suitable device for transferring an item to and/or from the MDU 104. FIGS. 2A and 2B depict the conveyance device 202 as a conveyor belt mounted to the MDU 104.

The drive module 204 may be configured to propel the MDU 104 in any appropriate manner. For example, in the illustrated embodiment, the motorized wheels 220 are operable to rotate in a first direction to propel the MDU 104 in a forward direction. The motorized wheels 220 are also operable to rotate in a second direction to propel the MDU 104 in a backward direction. In the illustrated embodiment, the drive module 204 is also configured to rotate the MDU 104 by rotating the motorized wheels 220 in different directions from one another or by rotating the motorized wheels 220 at different speeds from one another.

The sensor(s) 212 represents one or more sensors, detectors, or other components suitable for detecting or determining the location of the MDU 104, for obtaining item information (e.g., an identifier, a weight, a material, item dimensions, an item category (e.g., hazardous, fragile, etc.) and/or delivery information (e.g., a shipping address, a delivery zip code, a delivery location within the workspace), for obtaining conveyance information (e.g., instructions/operations for transferring an item to or from the conveyance device 202), or for obtaining any suitable information related to navigating and/or conveying an item with a workspace in any appropriate manner.

For example, in particular embodiments, the workspace 106 may be associated with a storage and/or sortation facility. The workspace 106 may include a number of navigation-related fiducial markers that mark points on a two-dimensional grid that covers all or a portion of the workspace 106. The workspace 106 may additionally or alternatively include a number of conveyance-related fiducial markers that are placed at particular locations of the workspace 106 such as near pickup and/or delivery locations. In such embodiments, the sensor(s) 212 may include a camera and suitable image- and/or video-processing components, such as an appropriately-programmed digital signal processor, to allow the sensor(s) 212 to detect navigation-related fiducial markers and/or conveyance-related fiducial markers within the camera's field of view. The control module 206 may store location information that the sensor(s) 212 updates as the sensor(s) 212 detects navigation-related fiducial marks. The control module 206 may additionally or alternatively store conveyance-related information that the sensor(s) 212 detects conveyance-related fiducial markers. The sensor(s) 212 may utilize navigation-related fiducial marker to maintain an accurate indication of the location the MDU 104 and to aid in navigation when moving within the workspace 106. The sensor(s) 212 may provide conveyance information detected/ascertained from conveyance-related fiducial markers to the conveyance device controller 210 for processing. In at least one example, the control module 206 may cause a historical record corresponding to the location information and/or conveyance information to be stored on local memory of the MDU 104. The control module 206 may further be configured to transmit/communicate the historical record at any suitable time (e.g., to the management module).

The sensor(s) 214 represents one or more sensors, detectors, or other components suitable for identifying an item and/or item attributes of an item being conveyed by the conveyance system 201 in any appropriate manner. The sensor(s) 214 may be capable of detecting orientation of the item in relation to the conveyance device 202 (e.g., a location on the conveyance system 201, an orientation such as a box that is placed one side, etc.). In some embodiments, the sensor(s) 214 may be configured to ascertain item information (e.g., an identifier, a weight, a material, item dimensions, an item category (e.g., hazardous, fragile, etc.), etc.) of the item being conveyed. By way of example, the sensor(s) 214 may be a scanner that is configured to scan a bar code located on packaging of the item. The bar code may be used to identity item information associated with the item from locally stored data (e.g., a mapping of the item identifier scanned to a set of item attributes) and/or the bar code may be used to request item information from a remote system (e.g., the management module 102 of FIG. 1). In some embodiments, the sensor(s) 214 may include a load cell (e.g., for determining a weight of the item), an image capture device (e.g., for determining the item identifier, item dimensions, a shipping address/zip code from a shipping label) or any suitable sensor that may be utilized to determine such item information.

The sensor(s) 216 may represent one or more sensors capable of detecting objects located in one or more different directions in which the MDU 104 is capable of moving. The sensor(s) 216 may utilize any appropriate components and techniques, including optical, radar, sonar, pressure-sensing and/or other types of detection devices appropriate to detect objects located in the direction of travel of the MDU 104. In at least one embodiment, the sensor(s) 216, or another component of the MDU 104 may communicate information to a management module (e.g., the management module 102 of FIG. 1). In at least one example, the control module 206 may cause a historical record to be updated with sensor data collected by the sensor(s) 216. The control module 206 may further be configured to transmit/communicate the historical record, including the obstacle data, at any suitable time to the management module.

The navigation controller 208 may monitor and/or control operation of the drive module 204. The navigation controller 208 may also receive information from sensors such as the sensor(s) 212 and the sensor(s) 216 and adjust the operation of the drive module 204 based on this information. Additionally, in particular embodiments, the MDU 104 may be configured to communicate with a management module 102 of FIG. 1 and the navigation controller 208 may receive commands transmitted to the MDU 104 and communicate information back to the management module 102 utilizing appropriate communication components of the MDU 104.

The navigation controller 208 may include any appropriate hardware and/or software suitable to provide the described functionality. In particular embodiments, the navigation controller 208 includes one or more general-purpose microprocessors programmed to provide the described functionality. Moreover, in particular embodiments, the navigation controller 208 may include hardware and software located in components that are physically distinct from the device that houses the drive module 204, the conveyance system 201, and/or the other components of the MDU 104 described above.

Figure 3:
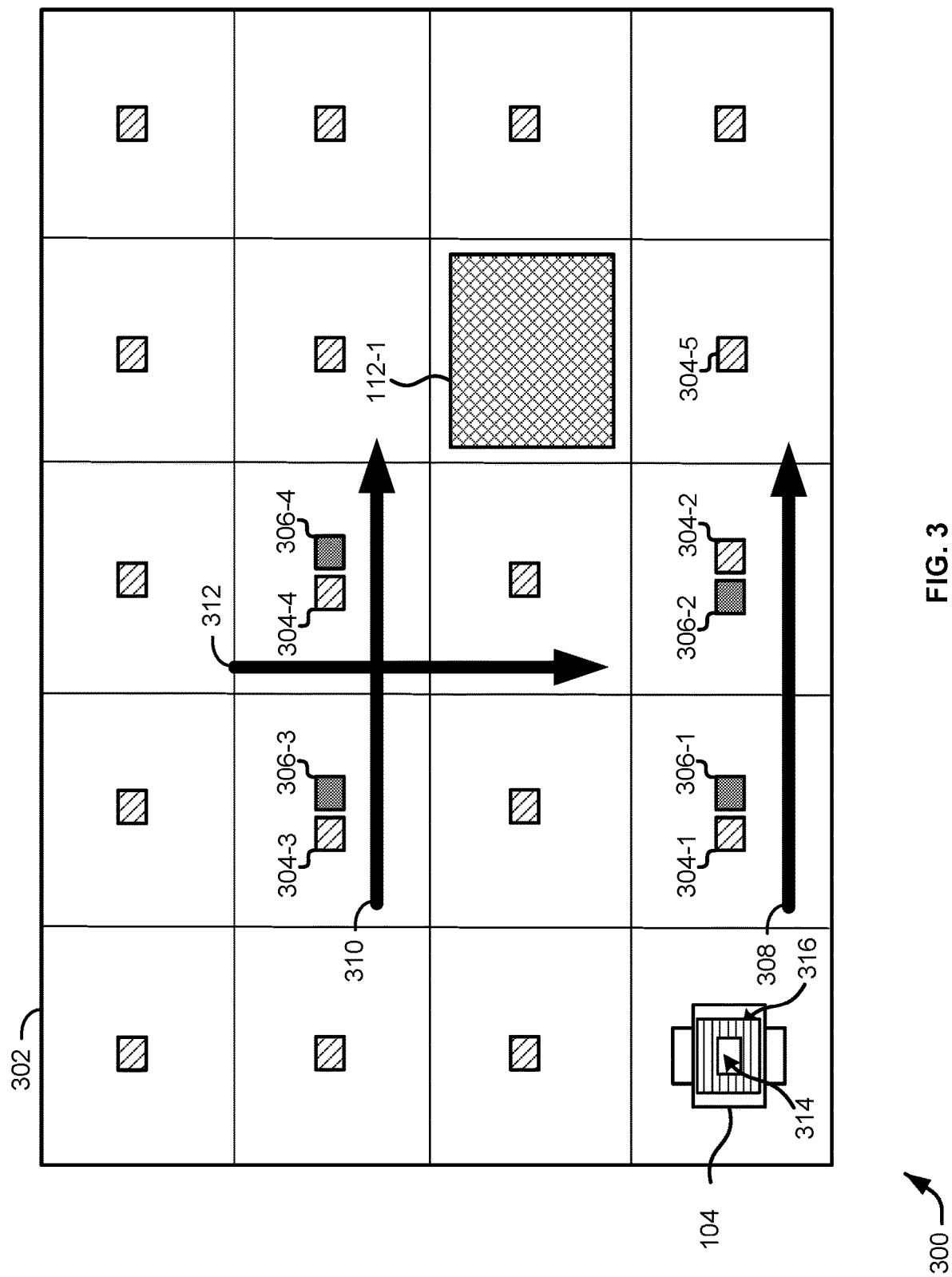
FIG. 3 illustrates in greater detail an example environment suitable for implementing aspects of a conveyance device controller, in accordance with at least one embodiment.

FIG. 3 illustrates in greater detail an example environment 300 suitable for implementing aspects of a conveyance device controller (e.g., the conveyance device controller 110 of FIG. 1), in accordance with at least one embodiment. Environment 300 include area 302 which is intended to depict a sub-portion of the workspace 106 of FIG. 1, although area 302 can be illustrative of workspaces other than workspace 106. In the embodiment depicted in FIG. 3, the area 302 includes navigation-related fiducial markers 304-1 through 304-5 (collectively referred to as "navigation-related fiducial markers 304", each being an example of the navigation-related fiducial markers 114 of FIG. 1). The area 302 may further include conveyance-related fiducial markers 306-1 through 306-5 (collectively referred to as "conveyance-related fiducial markers 306, each being an example of the conveyance-related fiducial markers 116 of FIG. 1).

In some embodiments, the navigation-related fiducial markers 304 can be distributed (e.g., in the grid-like configuration depicted, or another configuration) throughout the area 302 and may encode location information via any suitable method (e.g., a location identifier encoded in a bar code, a QR code, MaxiCode, Data Matrix, EZ Code, or any suitable identifying tag or code may be employed, encoded or not). Similarly, the conveyance-related fiducial markers 306 can be distributed (e.g., in the manner depicted) throughout the area 302 at various locations and may encode conveyance information via any suitable method (e.g., encoded in a bar code, a QR code, MaxiCode, Data Matrix, EZ Code, or any suitable identifying text or code may be employed, encoded or not).

In some embodiments, the conveyance-related fiducial markers 306 may be placed in a different configuration then the navigation-related fiducial markers 304 and placement of the conveyance-related fiducial markers 306 need not be relative or with respect to the navigation-related fiducial markers 304. By way of example, FIG. 3 is intended to depict an example distribution pattern for the conveyance-related fiducial markers 306 which places one or more conveyance-related fiducial markers within some distance of receptacle 112-1 (an example of the receptacles 112 of FIG. 1). The number, location, and/or orientation of the conveyance-related fiducial markers 306 may vary with each receptacle based, at least in part, on a number of potential navigation path approaches. For example, conveyance-related fiducial markers 306-1 and 306-2 may be placed in the manner depicted to provide conveyance information to an MDU that approaches the receptacle 112-1 from the direction as indicated by the arrow 308. Conveyance-related fiducial markers 306-3 and/or 306-4 may be placed in the manner depicted to provide conveyance information to an MDU that approaches the receptacle 112-1 from the direction as indicated by the arrow 310. Conveyance-related fiducial marker 306-4 may additionally or alternatively provide conveyance information to an MDU that approaches the receptacle 112-1 from the direction as indicated by the arrow 312. It should be appreciated that the conveyance information and the navigation information provided by the conveyance-related fiducial markers 306 and the navigation-related fiducial markers 308 may be encoded in a single fiducial marker, rather than utilizing separate fiducial markers as depicted in FIG. 3.

In some embodiments, conveyance-related fiducial markers 306 may encode conveyance information via any suitable method (e.g., a location identifier encoded in a bar code, a QR code, MaxiCode, Data Matrix, EZ Code, or any suitable text and/or code may be employed, encoded or not. By way of example, conveyance information may include and suitable combination of the following: item information related to the item (e.g., weight, dimensions, material, etc.), shipping information (e.g., a shipping address, a zip code, etc.), a delivery location and/or a particular receptacle within the workspace, a specific location (e.g., a particular conveyance-related fiducial marker) at which to engage the conveyance device, a speed at which to engage the conveyance device, a distance between a conveyance-related fiducial marker and a delivery location or receptacle, an orientation of a particular receptacle with respect to a particular conveyance-related fiducial marker, an angle at which to tilt to the conveyance device, or any suitable instructions and/or information for operating the conveyance device to obtain or deliver at item.

As the MDU 104 travels through the area 302, the MDU may be configured to obtain location information from the navigation-related fiducial markers 304 utilizing a sensor of the MDU 104 such as a bar code reader, a scanner, an image capture device, etc. The MDU 104 may provide current location, current state, and/or other characteristics of the MDU 104 to a management module (e.g., the management module 102 of FIG. 1) to provide updated awareness of the tasks and location of the MDU 104. In some embodiments, an MDU may provide this information periodically and/or incrementally to notify the management module 102 of its location and/or a completion or delay associated with a portion of its assigned task. The management module 102 may utilize the information provided by the MDU 104 to determine and/or modify planned navigation paths, update task assignment, or any suitable operation related to task assignment and navigation of the MDU 104 within the workspace 106. In some embodiments, the MDU 104 may ascertain location information without utilizing navigation-related fiducial markers. For example, the MDU 104 may additionally or alternatively utilize a global positioning system, image recognition techniques (e.g., identifying location through images via objects and/or references points, etc.), or the like to ascertain location information. According to the techniques described herein, the management module 102, in concert with a navigation controller of the MDU 104 may coordinate the motion of MDU 104 utilizing location information obtained via the navigation-related fiducial markers 304.

As the MDU 104 travels through the area 302 carrying item 314 utilizing conveyance device 316 (e.g., a conveyor belt mounted to the MDU 104) it may travel in the direction indicated by arrow 308. As the MDU passes over conveyance-related fiducial marker 306-1 (or encounters a conveyance-related location), a sensor of the MDU (e.g., the sensor(s) 212 of FIG. 2) may be employed to obtain conveyance information from the conveyance-related fiducial marker 306-1. As an illustrative example, the conveyance information may include at least one of: an identifier for the receptacle 112-1, a specific location and/or distance from the receptacle 112-1 at which to engage the conveyance device 316, a speed at which to engage the conveyance device, a distance between a conveyance-related fiducial marker 306-1 and the receptacle 112-1, an orientation of receptacle 112-1 with respect to conveyance-related fiducial marker 306-1 (e.g., ahead on your left), or any suitable instructions and/or information for operating the conveyance device 316 to obtain or deliver at item.

Continuing on with the example, the MDU 104 may subsequently pass over conveyance-related fiducial marker 306-2, a sensor of the MDU (e.g., the sensor(s) 212 of FIG. 2) may be employed to obtain conveyance information from the conveyance-related fiducial marker 306-2. The conveyance information obtained from the conveyance-related fiducial marker 306-2 may include at least one of: an identifier for the receptacle 112-1, a specific location and/or distance from the receptacle 112-1 at which to engage the conveyance device 316, a speed at which to engage the conveyance device 316, a distance between a conveyance-related fiducial marker 306-2 and the receptacle 112-1, an orientation of receptacle 112-1 with respect to conveyance-related fiducial marker 306-2 (e.g., ahead on your left), or any suitable instructions and/or information for operating the conveyance device 316 to obtain or deliver at item. In some examples, the MDU 104 may calculate a speed and/or other parameters for operating the conveyance device 316 based at least in part on the conveyance information obtained from conveyance-related fiducial markers 306-1 and 306-2. As a non-limiting example, the conveyance information obtained from conveyance-related fiducial markers 306-1 and 306-2 may be used to calculate a travelling speed of the MDU 104. The calculated travelling speed can be used to calculate an appropriate speed and/or location at which to begin operating the conveyance device 316 in order to deliver the item 314 to the receptacle 112-1. Generally, any suitable parameter for operating the conveyance device 316 may be calculated using any suitable combination of conveyance information obtained from one or more of the conveyance-related fiducial markers 306.

In some embodiments, the conveyance device controller 110 may be configured to determine a set of operations to be performed by the conveyance device 316 (e.g., a conveyor belt) mounted to an MDU. For example, the conveyance device controller 110 may be configured to utilize conveyance information to determine particular operations to be performed by a conveyance device 316 in order to deliver the item 314 to receptacle 112-1. In some embodiments, the conveyance device controller 110 operates independently from navigational aspects of the MDU. That is in some cases, the conveyance device controller 110 cannot influence and/or modify the speed or heading of the MDU 104 as a whole as the operation of the conveyance device 316 may be entirely decoupled from the navigation of the MDU 104. In some examples, while the conveyance device 316 may operate independently from the navigation of the MDU 104, the conveyance device controller 110 may be configured to send a speed and/or heading change request to the navigation controller 108 in order to modify a speed and or direction of approach with respect to the receptacle 112-1.

As another example, the MDU 104 may approach receptacle 112-1 from the direction indicated by arrow 312. As the MDU 104 passes over conveyance-related fiducial marker 306-4 (or a conveyance-related location is encountered), a sensor of the MDU (e.g., the sensor(s) 212 of FIG. 2) may be employed to obtain conveyance information from the conveyance-related fiducial marker 306-4. In this example, the conveyance information may indicate that the conveyance device 316 is to be engaged (e.g., either immediately, at the expiration of a period of time (e.g., 3 seconds), etc.). The speed at which the conveyance device 316 may be instructed to operate at a predetermined default speed and/or direction, or the speed and/or direction at which the conveyance device 316 is to be operated may be provided and/or ascertained from the conveyance information. For example, the conveyance information may identify a location and/or an orientation of the receptacle 112-1 and/or a distance until the receptacle 112-1 is encountered. Accordingly, the conveyance device controller 110 may be configured to determine the operational speed and/or direction of the conveyance device 316 in order to transfer the item 314 to the receptacle 112-1. In some embodiments, the conveyance information may be utilized by the conveyance device controller 316 to deliver items such that an original speed and/or heading of MDU 104 is maintained. In other words, the MDU 104 does not have to slow or halt at the receptacle 112-1 in order to transfer the item 314.

In some embodiments, the conveyance device 316 may be instructed by a management module (e.g., the management module 102 of FIG. 1) to perform one or more operations when a conveyance-related fiducial marker and/or a conveyance location is encountered. By way of example, a GPS coordinate may be identified in an instructions as the location at which the conveyance device is to be actuated. Accordingly, when the MDU 104 encounters the location (e.g., arrives at the designated GPS coordinate), the location can be used to trigger the operations of the conveyance device. As a non-limiting example, when the MDU 104 (configured with a lift platform type conveyance device) encounters a GPS location corresponding to conveyance-related fiducial marker 306-4 (or the conveyance-related fiducial marker 306-4 itself), the lift platform may be actuated to lift the item to a designated height such that the item is pushed against a plane/object (not depicted) such and the item is deflected off the MDU 104 and into the receptacle 112-1.

In some embodiments, the conveyance device 316 may be operating in accordance with conveyance information obtained from the conveyance-related fiducial markers 306 as well as with item information for the item 314. In other words, the speed, tilt, elevation, or other operating parameters of the conveyance device 316 may vary based on the item and/or item attributes of the item being conveyed. By way of example, if the item 314 is relatively large and heavy, the conveyance device 316 might be instructed to start moving the item 314 toward the side facing the receptacle 112-1 at a speed X, starting at location Y. Whereas, if the item 314 is relatively small and light, a set of operations identified for the conveyance device 316 may include instructions to start moving the item 314 toward the side facing the receptacle 112-1 at a speed P, starting at location Q, where speed X may or may not equal speed P, and where location Y may or may not equal location Q. In the examples provided in FIG. 3, item information may have been previously obtained by the MDU 104 during task assignment and/or during operations conducted for obtaining the item 314. Some examples of which may be discussed further below with respect to FIG. 4.

Figure 4:
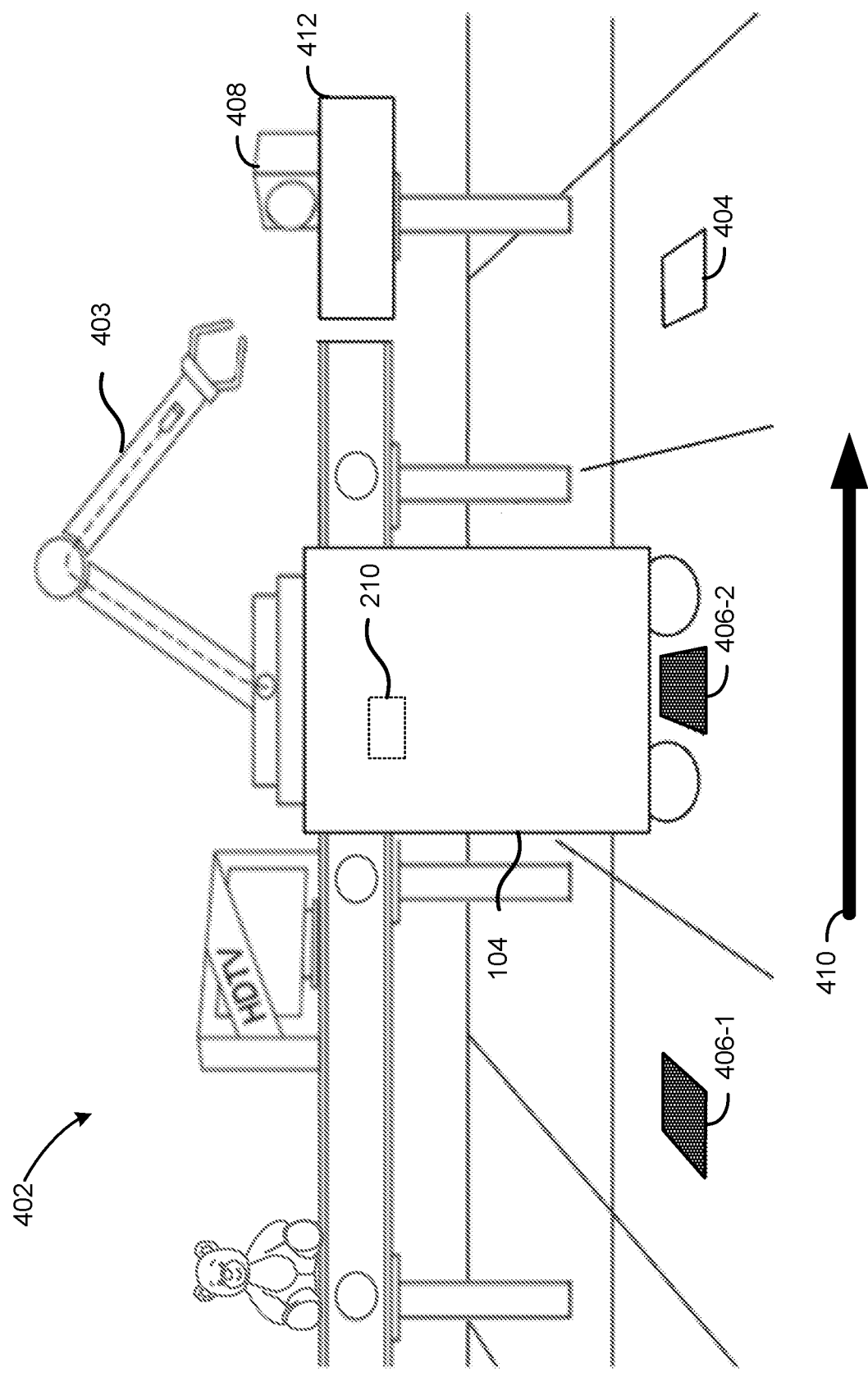
FIG. 4 is a schematic diagram illustrating example techniques for implementing aspects of a conveyance device controller, in accordance with at least one embodiment.

FIG. 4 is a schematic diagram illustrating example technique for implementing aspects of a conveyance device controller (e.g., the conveyance device controller 110 of FIG. 1), in accordance with at least one embodiment. Environment 400 includes area 402 which is intended to depict the area 402 of FIG. 1, although area 402 can be illustrative of areas/workspaces other than those found in the workspace 106 of FIG. 1. In the embodiment depicted in FIG. 4, the area 402 may include any suitable number of navigation-related fiducial markers (e.g., navigation-related fiducial marker 404. The area 402 may further include conveyance-related fiducial markers 406-1 and 406-2 (collectively referred to as "conveyance-related fiducial markers 406, each being an example of the conveyance-related fiducial markers 116 of FIG. 1).

The environment 400 of FIG. 4 is intended to depict an MDU (e.g., MDU 104) obtaining an item from the area 402 of FIG. 1. In the example depicted in FIG. 4, the MDU 104 is configured with conveyance device 403 (e.g., an example of a conveyance device) may be is configured to pick up and/or deposit items to and from the MDU 104. The conveyance device controller 210 of FIG. 2 may be configured to operate the conveyance device 403 of the MDU in FIG. 4.

In some embodiments, navigation-related fiducial markers (e.g., including the navigation-related fiducial marker 404) can be distributed throughout the area 402 and may encode location information via any suitable method (e.g., a location identifier encoded in a bar code, a QR code, MaxiCode, Data Matrix, EZ Code, or any suitable identifying tag or code may be employed, encoded or not). Similarly, the conveyance-related fiducial markers 406 can be distributed (e.g., in the manner depicted) throughout the area 402 at various locations and may encode conveyance information via any suitable method (e.g., encoded in a bar code, a QR code, MaxiCode, Data Matrix, EZ Code, or any suitable identifying text or code may be employed, encoded or not). In some embodiments, the conveyance-related fiducial markers 306 may be placed with each navigation-related fiducial marker 404, or in a different pattern then the navigation-related fiducial markers, and placement of the conveyance-related fiducial markers 406 need not be relative or with respect to the navigation-related fiducial markers. The number, location, and/or orientation of the conveyance-related fiducial markers 406 utilized in area 402 may vary. For example, conveyance-related fiducial markers 406-1 and 406-2 may be placed in the manner depicted to provide conveyance information to an MDU who approaches an item (e.g., item 408) to be obtained from the area 402. In some embodiments, the MDU 104 may approach from the direction as indicated by the arrow 410. Conveyance-related fiducial markers 406-1 and/or 406-2 may be placed in the manner depicted to provide conveyance information to an MDU who approaches the item 408 (located at receptacle 412) from the direction as indicated by the arrow 410. It should be appreciated that the conveyance information and the navigation information provided by the conveyance-related fiducial markers 406 and the navigation-related fiducial marker 404 may be encoded in a single fiducial marker, rather than utilizing separate fiducial markers as depicted in FIG. 4.

In some embodiments, conveyance-related fiducial markers 406 may encode conveyance information via any suitable method (e.g., a location identifier encoded in a bar code, a QR code, MaxiCode, Data Matrix, EZ Code, or any suitable text and/or code may be employed, encoded or not. By way of example, conveyance information may include and suitable combination of the following: item information related to the item (e.g., weight, dimensions, material, etc.), shipping information (e.g., a shipping address, a zip code, etc.), a delivery location and/or a particular receptacle within the workspace, a specific location (e.g., a particular conveyance-related fiducial marker) at which to engage the conveyance device, a speed at which to engage the conveyance device, a distance between a conveyance-related fiducial marker and a delivery location or receptacle, an orientation of a particular receptacle with respect to a particular conveyance-related fiducial marker, an angle at which to tilt to the conveyance device, or any suitable instructions and/or information for operating the conveyance device to obtain or deliver at item.

As the MDU 104 travels through the area 402, the MDU 104 may be configured to obtain location information from the navigation-related fiducial markers 404 utilizing a sensor of the MDU 104 such as a bar code reader, a scanner, an image capture device, etc. The MDU 104 may provide current location, current state, and/or other characteristics of the MDU 104 to a management module (e.g., the management module 102 of FIG. 1) to provide updated awareness of the tasks and location of the MDU 104. In some embodiments, an MDU may provide this information periodically and/or incrementally to notify the management module 102 of its location and/or a completion or delay associated with a portion of its assigned task. The management module 102 may utilize the information provided by the MDU 104 to determine and/or modify planned navigation paths, update task assignment, or any suitable operation related to task assignment and navigation of the MDU 104 within the workspace 106. In some embodiments, the MDU 104 may ascertain location information without utilizing navigation-related fiducial markers. For example, the MDU 104 may additionally or alternatively utilize a global positioning system, image recognition techniques (e.g., identifying location through images via objects and/or references points, etc.), or the like to ascertain location information. According to the techniques described herein, the management module 102, in concert with a navigation controller of the MDU 104 may coordinate the motion of MDU 104 utilizing location information obtained via the navigation-related fiducial markers 404.

As the MDU passes over conveyance-related fiducial marker 406-1, a sensor of the MDU (e.g., the sensor(s) 212 of FIG. 2) may be employed to obtain conveyance information from the conveyance-related fiducial marker 406-1. As an illustrative example, the conveyance information may include at least one of: item information associated with the item 408, an identifier for a receptacle in which the item 408 is to be deposited, a specific location and/or distance from the receptacle 412 at which to engage the conveyance device 403, a speed at which to engage the conveyance device, instructions for operating the conveyance device 403, a distance between a conveyance-related fiducial marker 406-1 and the receptacle 412, an orientation of receptacle 412 with respect to conveyance-related fiducial marker 306-1 (e.g., ahead on your left), or any suitable instructions and/or information for operating the conveyance device 403 to obtain or deliver at item.

Continuing on with the example, the MDU 104 may subsequently pass over conveyance-related fiducial marker 406-2, at which time a sensor of the MDU (e.g., the sensor(s) 212 of FIG. 2) may be employed to obtain conveyance information from the conveyance-related fiducial marker 406-2. The conveyance information obtained from the conveyance-related fiducial marker 406-2 may include at least one of: item information associated with the item 408, an identifier for a receptacle in which the item 408 is to be deposited, a specific location and/or distance from the receptacle 412 at which to engage the conveyance device 403, a speed at which to engage the conveyance device, instructions for operating the conveyance device 403, a distance between a conveyance-related fiducial marker 406-2 and the receptacle 412, an orientation of receptacle 412 with respect to conveyance-related fiducial marker 306-1 (e.g., ahead on your left), or any suitable instructions and/or information for operating the conveyance device 403 to obtain or deliver at item. In some examples, the MDU 104 may calculate a speed and/or other parameters for operating the conveyance device 316 based at least in part on the conveyance information obtained from conveyance-related fiducial markers 406-1 and 406-2. As a non-limiting example, the conveyance information obtained from conveyance-related fiducial markers 406-1 and 406-2 may be used to calculate a travelling speed of the MDU 104. The calculated travelling speed can be used to calculate an appropriate speed and/or location at which to begin operating the conveyance device 403 in order to obtain the item 408 from the receptacle 412. Generally, any suitable parameter for operating the conveyance device 403 may be calculated using any suitable combination of conveyance information obtained from one or more of the conveyance-related fiducial markers 406.

In some embodiments, the conveyance device controller 210 may be configured to determine a set of operations to be performed by the conveyance device 403 (e.g., a conveyor belt) mounted to an MDU. For example, the conveyance device controller 210 may be configured to utilize conveyance information to determine particular operations to be performed by a conveyance device 403 in order to obtain the item 408 from receptacle 412. In some embodiments, the conveyance device controller 210 operates independently from navigational aspects of the MDU. That is in some cases, the conveyance device controller 210 cannot influence and/or modify the speed or heading of the MDU 104 as a whole as the operation of the conveyance device 403 may be entirely decoupled from the navigation of the MDU 104. In some examples, while the conveyance device 403 may operate independently from the navigation of the MDU 104, the conveyance device controller 210 may be configured to send a speed and/or heading change request to the navigation controller 108 of FIG. 1 in order to modify a speed and or direction of approach with respect to the receptacle 412.

As another example, the MDU 104 may approach receptacle 412 from the direction indicated by arrow 410. As the MDU 104 passes over only conveyance-related fiducial marker 306-2, a sensor of the MDU (e.g., the sensor(s) 212 of FIG. 2) may be employed to obtain conveyance information from the conveyance-related fiducial marker 306-2. In this example, the conveyance information may indicate that the conveyance device 403 is to be engaged (e.g., either immediately, at the expiration of a period of time (e.g., 3 seconds), etc.). The speed at which the conveyance device 403 may be instructed to operate at a predetermined default speed and/or direction, or the speed and/or direction at which the conveyance device 403 is to be operated may be provided and/or ascertained from the conveyance information. For example, the conveyance information may identify a location and/or an orientation of the receptacle 412 and/or a distance until the receptacle 412 is encountered. Accordingly, the conveyance device controller 210 may be configured to determine the operational speed and/or direction of the conveyance device 403 in order to obtain the item 408 from the receptacle 112. In some embodiments, the conveyance information may be utilized by the conveyance device controller 210 to obtain items such that an original speed and/or heading of MDU 104 is maintained. In other words, the MDU 104 does not have to slow or halt at the receptacle 412 in order to transfer the item 408. Accordingly, an overall throughput amount of the area 402 may be increased.

In some embodiments, the conveyance device 403 may operate in accordance with conveyance information obtained from the conveyance-related fiducial markers 406 as well as with item information for the item 408. In other words, the speed, tilt, or other operating parameters of the conveyance device 403 may vary based on the item and/or item attributes of the item being conveyed.

In some embodiments, at least a portion of the item information may be obtained via the conveyance information. In some cases, an identifier of the item 408 obtained via the conveyance information may be utilized to query a database (e.g., data store 538 and/or 554 of FIG. 5 discussed below) for item information associated with the item 408. As a non-limiting example, the conveyance-related fiducial markers 406-2 and query a data store (e.g., an inventory store of an online provider) and/or the management module 102 of FIG. 1 to determine item information (e.g., a shipping address, a destination receptacle within the workspace, item dimensions, weight, material of manufacture, etc.).

According to some embodiments, the item information may be obtained (e.g., via sensor(s) 216 of FIG. 2) from a shipping label or label, text, and/or by identifying the item 408 from an image and ascertaining the attributes of the item 408 (e.g., approximating dimensions) or obtaining item information from a remote source (e.g., the management module 102). In still further examples, the MDU 104 may be configured with sensor(s) (e.g., sensor(s) 214 of FIG. 2) which may be employed to ascertain item information associated with the item. By way of example, as the item is obtained and carried by the MDU 104, the conveyance device controller 210 may utilize the sensor(s) 214 to determine a weight and/or orientation and/or dimensions of the item 408. Such item information may be utilized when the MDU 104 delivers the item 408 to a receptacle as was described above in connection with FIG. 3.

In at least one embodiment, the conveyance device controller 210 may be configured to operate the conveyance device 403 in accordance with conveyance information obtained from the conveyance-related fiducial markers 406 and/or the item information obtained for the item 408. In other words, the operations of the conveyance device 403 may vary based at least in part on the item and/or item attributes of the item being conveyed.

Figure 5:
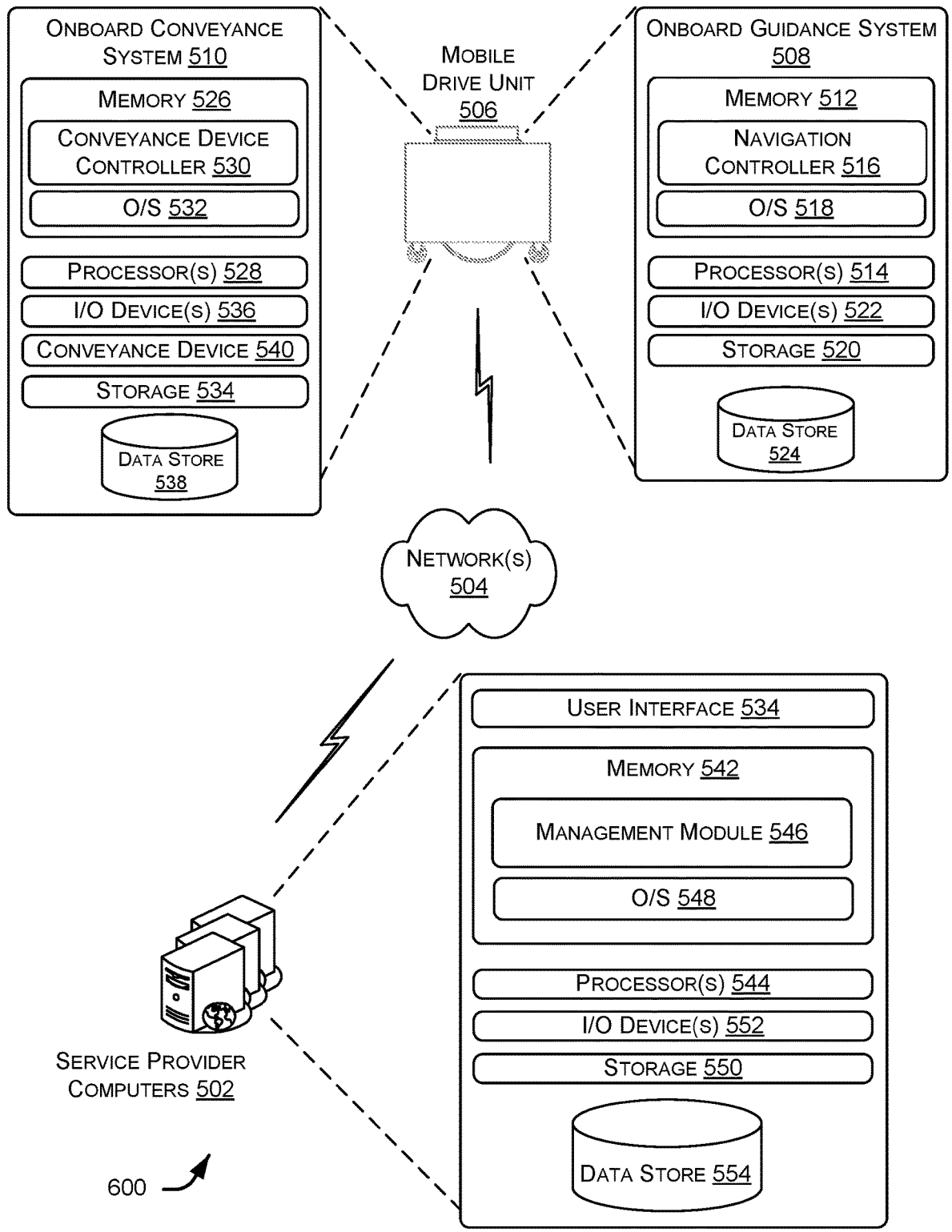
FIG. 5 is an example system architecture for implementing aspects of item conveyance, in accordance with at least one embodiment.

FIG. 5 is an example system architecture for system 500 that implements aspects of item conveyance, in accordance with at least one embodiment. The system 500 may include service provider computers 502. The service provider computers 502 may support an electronic marketplace (not shown) and interface with purchase and delivery services of the electronic marketplace. In this manner, the service provider computers 502 may coordinate receiving, storing, sorting, packaging, and/or shipping of items in a warehouse (e.g., an example of workspace 106 of FIG. 1) operated by, or on behalf of, the electronic marketplace provider. In some examples, the service provider computers 502 may be a stand-alone service operated on its own or in connection with an electronic marketplace. In either example, the service provider computers 502 may be in communication with the MDUs 104 of FIG. 1 via one or more network(s) 504 (hereinafter, "the network 504"). The network 504 may include any one or a combination of many different types of networks, such as cable networks, the Internet, wireless networks, cellular networks, radio networks, and other private and/or public networks.

Turning now to the details of the mobile drive unit (MDU) 506 (an example of one of the MDUs 104 of FIG. 1), the MDU 506 may include an onboard guidance system 508 and an onboard conveyance system 510. The onboard guidance system 508 may include at least one memory 512 and one or more processing units (or processor(s) 514). The processor(s) 514 may be implemented as appropriate in hardware, computer-executable instructions, software, firmware, or combinations thereof. Computer-executable instruction, software or firmware implementations of the processor(s) 514 may include computer-executable or machine-executable instructions written in any suitable programming language to perform the various functions described.

The memory 512 may include more than one memory and may be distributed throughout the onboard guidance system 508. The memory 512 may store program instructions (e.g. for the navigation controller 516, an example of the navigation controller 108 of FIG. 1) that are loadable and executable on the processor(s) 514, as well as data generated during the execution of these programs. The navigation controller 516 may be configured to receive task assignments, planned paths, navigation information and/or instructions from management module 546 and execute one or more navigational operations of the MDU according to data received. Depending on the configuration and type of memory including the navigation controller 516, the memory 512 may be volatile (such as random access memory (RAM)) and/or non-volatile (such as read-only memory (ROM), flash memory, or other memory). The memory 512 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM. Turning to the contents of the memory 512 in more detail, the memory 512 may include an operating system 518 and one or more application programs, modules or services for implementing the features disclosed herein including at least the navigation controller 516.

In some examples, the onboard guidance system 508 may also include additional storage 520, which may include removable storage and/or non-removable storage. The additional storage 520 may include, but is not limited to, magnetic storage, optical disks, and/or tape storage. The disk drives and their associated computer-readable media may provide non-volatile storage of computer-readable instructions, data structures, program modules, and other data for the computing devices.

The memory 512 and the additional storage 520, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard guidance system 508. The modules of the onboard guidance system 508 may include one or more components. The onboard guidance system 508 may also include input/output (I/O) device(s) 522 and/or ports, such as for enabling connection with a keyboard, a mouse, a pen, a voice input device, a touch input device, a display, speakers, a printer, or other I/O device. In at least some embodiments, the I/O device(s) 522 may include with one or more sensors (e.g., sensor(s) 212 and/or the sensor(s) 216) including any suitable combination of one or more imaging devices, one or more accelerometers, one or more gyroscopes, one or more scanning devices, or any suitable sensor configured to collect location information and/or conveyance information utilizing navigation-related fiducial markers and conveyance-related fiducial markers respectively.

The onboard guidance system 508 may also include data store 524. The data store 524 may include one or more databases, data structures, or the like for storing and/or retaining information associated with the MDU 506 (e.g., planned paths, execution step instructions, etc.) and/or location information obtained via one or more navigation-related fiducial markers.

The onboard conveyance system 510 may include at least one memory 526 and one or more processing units (or processor(s) 528). The processor(s) 528 may be implemented as appropriate in hardware, computer-executable instructions, software, firmware, or combinations thereof. Computer-executable instruction, software or firmware implementations of the processor(s) 528 may include computer-executable or machine-executable instructions written in any suitable programming language to perform the various functions described.

The memory 526 may include more than one memory and may be distributed throughout the onboard conveyance system 510. The memory 526 may store program instructions (e.g. for the conveyance device controller 530, an example of the conveyance device controller 110 of FIG. 1) that are loadable and executable on the processor(s) 528, as well as data generated during the execution of these programs. Depending on the configuration and type of memory including the conveyance device controller 530, the memory 526 may be volatile (such as random access memory (RAM)) and/or non-volatile (such as read-only memory (ROM), flash memory, or other memory). The memory 526 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 526 may include multiple different types of memory, such as static random access memory (SRAM), dynamic random access memory (DRAM), or ROM. Turning to the contents of the memory 526 in more detail, the memory 526 may include an operating system 532 and one or more application programs, modules or services for implementing the features disclosed herein including at least the conveyance device controller 530.

In some examples, the onboard conveyance system 510 may also include additional storage 534, which may include removable storage and/or non-removable storage. The additional storage 534 may include, but is not limited to, magnetic storage, optical disks, and/or tape storage. The disk drives and their associated computer-readable media may provide non-volatile storage of computer-readable instructions, data structures, program modules, and other data for the computing devices.

The memory 526 and the additional storage 534, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard conveyance system 510. The modules of the onboard conveyance system 510 may include one or more components. The onboard conveyance system 510 may also include input/output (I/O) device(s) 536 and/or ports, such as for enabling connection with a keyboard, a mouse, a pen, a voice input device, a touch input device, a display, speakers, a printer, or other I/O device. In at least some embodiments, the I/O device(s) 536 may include with one or more sensors (e.g., sensor(s) 212 and/or the sensor(s) 214) including any suitable combination of one or more imaging devices, one or more accelerometers, one or more gyroscopes, one or more load cells, one or more scanning devices, or any suitable sensor configured to collect conveyance information utilizing conveyance-related fiducial markers and/or item information associated with an item being conveyed.

The onboard conveyance system 510 may also include data store 538. The data store 538 may include one or more databases, data structures, or the like for storing and/or retaining conveyance information obtained by the MDU 506.

In some embodiments, the onboard conveyance system 510 may include conveyance device 540 (or more than one conveyance device). A conveyance device may include a conveyor belt, a tilt plane, a robotic arm, or any suitable device that is mounted to the MDU 506 which is operable to transfer items to and from the MDU 506. The conveyance device controller 530 may be configured to instruct and/or operate the conveyance device 540 utilizing the conveyance information obtained from one or more conveyance-related fiducial markers. In at least one embodiment, the onboard conveyance system 510 may be communicatively coupled with the management module 546 (an example of the management module 102 of FIG. 1) and/or the onboard guidance system 508, while in other examples, the onboard conveyance system 510 may operate in a stand-alone capacity without communicating with the management module 546 and/or the onboard guidance system 508.

The service provider computers 502, perhaps arranged in a cluster of servers or as a server farm, may be configured to manage the MDU 506 as part of an inventory and/or sortation system. For example, the service provider computer 502 may be configured to manage the MDUs 104 within the workspace 106 of FIG. 1 (e.g., a warehouse for storing and/or sorting items). The service provider computers 502 may include at least one memory 542 and one or more processing units (or processor(s)) 544. The processor(s) 544 may be implemented as appropriate in hardware, computer-executable instructions, software, firmware, or combinations thereof. Computer-executable instruction, software or firmware implementations of the processor(s) 544 may include computer-executable or machine-executable instructions written in any suitable programming language to perform the various functions described.

The memory 542 may include more than one memory and may be distributed throughout the service provider computers 502. The memory 542 may store program instructions (e.g., related to the management module 546) that are loadable and executable on the processor(s) 544, as well as data generated during the execution of these programs. Depending on the configuration and type of memory including the management module 546, the memory 542 may be volatile (such as random access memory (RAM)) and/or non-volatile (such as read-only memory (ROM), flash memory, or other memory). The service provider computers 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 542 may include multiple different types of memory, such as static random access memory (SRAM), dynamic random access memory (DRAM), or ROM.

Turning to the contents of the memory 542 in more detail, the memory 542 may include an operating system 548 and one or more application programs, modules or services for implementing the features disclosed herein including the management module 546. As discussed above in connection with FIG. 1, management module 546 may be configured to assign tasks to the MDU 506. In some examples, the management module 546 may select the MDU 506 from a set of MDUs based on a current location of the MDU 506, one or more locations associated with the task, various capabilities and/or attributes of the MDU (e.g., a speed capability, a maximum load capacity, etc.), other tasks assigned to one or more MDUs, or any suitable combination of the above. Additionally, the management module 546 may be configured to generate and transmit task assignments and/or navigation instructions (e.g., planned path instructions) to the navigation controller 516. In some embodiments, the management module 546 may be configured to generate and transmit information to the conveyance device controller 530 such as task assignments, conveyance information, item information, or any suitable information for obtaining and/or delivering an item.

Aspects of the management module 546 may be discussed further below in connection with FIG. 6.

In some examples, the service provider computers 502 may also include additional storage 550, which may include removable storage and/or non-removable storage. The additional storage 550 may include, but is not limited to, magnetic storage, optical disks, and/or tape storage. The disk drives and their associated computer-readable media may provide non-volatile storage of computer-readable instructions, data structures, program modules, and other data for the computing devices.

The memory 542 and the additional storage 550, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 502. The modules of the service provider computers 502 may include one or more components. The service provider computers 502 may also include input/output (I/O) device(s) 552 and/or ports, such as for enabling connection with a keyboard, a mouse, a pen, a voice input device, a touch input device, a display, speakers, a printer, or other I/O device.

In some examples, the service provider computers 502 may also include data store 554. The data store 554 may include one or more databases, data structures, or the like for storing and/or retaining any suitable information associated with the service provider computers 502. In some examples, the service provider computers 502 may store the item information associated with various items, task assignments, planned paths, location information obtained from the MDU 104, conveyance information, or any suitable information related to the examples provided herein.

Figure 6:
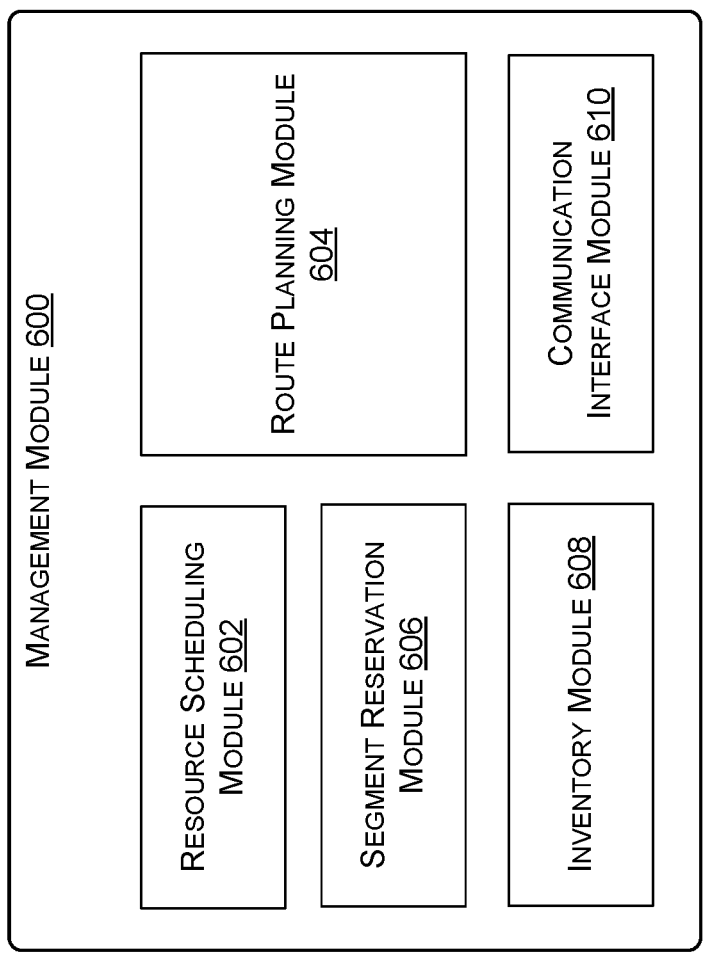
FIG. 6 illustrates in greater detail the components of an example management module, in accordance with at least one embodiment.

FIG. 6 illustrates in greater detail the components of a particular embodiment of a management module 600 (e.g., the management module 546 of FIG. 5). As shown, the example embodiment includes a resource scheduling module 602, a route planning module 604, a segment reservation module 606, an inventory module 608, and a communication interface module 610. As discussed above, the management module 600 may represent a single component, multiple components located at a central location within system 500, or multiple components distributed throughout system 500.

In at least one embodiment, the resource scheduling module 602 may be configured to process received item requests and generate one or more assigned tasks to be completed by the components of the system 500 (e.g., the MDU 506 of FIG. 5). The resource scheduling module 602 may also select one or more appropriate components for completing the assigned tasks and may communicate, via the communication interface module 610, the assigned tasks to the relevant components. In some examples, the resource scheduling module 602 may select the one or more appropriate components (e.g., MDUs) based on a location of the MDU (e.g., as determined by the sensor(s) 212 of FIGS. 2A and 2B). In some embodiments, the resource scheduling module may transmit task assignments, conveyance information associated with the task, item information for item(s) associated with the task, or any suitable combination of the above via the communication interface module 610 to any suitable component of the system (e.g., one or more MDUs).

In at least one embodiment, the route planning module 604 may receive route requests from an MDU. These route requests may identify one or more destinations associated with a task the requesting MDU is executing. In response to receiving a route request, the route planning module 604 may generate a path to one or more destinations identified in the route request. The route planning module 604 may implement any appropriate algorithms utilizing any appropriate parameters, factors, and/or considerations to determine the appropriate path. After generating an appropriate path, the route planning module 604 may transmit a route response identifying the generated path to the requesting the MDU using the communication interface module 610.

In at least one embodiment, the segment reservation module 606 may receive reservation requests from MDUs attempting to move along paths generated by the route planning module 604. These reservation requests may indicate a request for the use of a particular portion of a workspace corresponding to a portion of a planned path (referred to herein as a "segment"). In response to received reservation requests, segment reservation module 606 may transmit a reservation response granting or denying the reservation request to the requesting MDU using the communication interface module 610. Upon receipt of a reservation response granting space to an MDU, the MDU may be configured to execute instructions to traverse the space.

In at least one embodiment, the inventory module 608 may maintain information about the location and number of inventory items in a workspace (e.g., the workspace 106 of FIG. 1). Information can be maintained about the number of inventory items at particular receptacles (e.g., receptacles 112 of FIG. 1), and the maintained information can include the location of those inventory items with respect to the receptacles. The inventory module 608 can also maintain a data store of various item and item information associated with those items. Item information may be provided by the inventory module 608 and transmitted to an MDU via the communication interface module 610 (e.g., to the navigation controller 108 of FIG. 1 and/or the conveyance device controller 110 of FIG. 1).

In at least one embodiment, the communication interface module 610 may facilitate communication between management module 600 and other components of the system 500 (e.g., MDU 104), including reservation responses, reservation requests, route requests, route responses, task assignments, item information, conveyance information related to task assignments, and the like. Depending on the configuration of management module 600, communication interface module 610 may be responsible for facilitating wireless communication between management module 600 and the various components of system 500 (e.g., MDU 506). Any suitable form of wireless and/or wired communication may be utilized by the management module 600 to communicate with the MDUs of the system. Furthermore, management module 600 may, in particular embodiments, represent a portion of an MDU. In such embodiments, communication interface module 610 may facilitate communication between management module 600 and other parts of the same system component.

In general, the resource scheduling module 602, the route planning module 604, the segment reservation module 606, the inventory module 608, and the communication interface module 610, may each represent any appropriate hardware and/or software suitable to provide the described functionality. In addition, as noted above, management module 600 may, in particular embodiments, represent multiple different discrete components and any or all of the resource scheduling module 602, the route planning module 604, the segment reservation module 606, the inventory module 608, and the communication interface module 610 may represent components physically separate from the remaining elements of management module 600. Moreover, any two or more of the resource scheduling module 602, the route planning module 604, the segment reservation module 606, the inventory module 608, and the communication interface module 610 may share common components.

Figure 7:
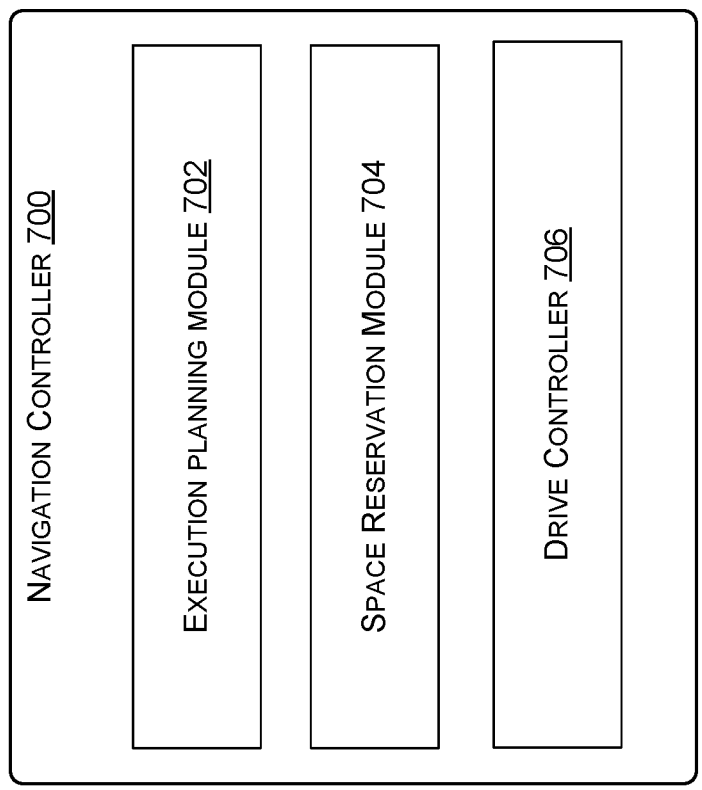
FIG. 7 illustrates in greater detail the components of an example navigation controller, in accordance with at least one embodiment.

FIG. 7 illustrates in greater detail an example navigation controller 700 (an example of the navigation controller 108 of FIG. 1), in accordance with at least one embodiment. The navigation controller 700 may execute on an MDU. As shown, the example embodiment includes an execution planning module 702, a space reservation module 704, and a drive controller 706. It should be appreciated that each module of FIG. 7 may be executed on a single computer, and or each component, or sets of components may be executed on separate computers. The modules of FIG. 7 may be communicatively coupled to the data store 524 of FIG. 5 such that data may be exchanged between the modules and the data store 524. It should be appreciated that in some embodiments, any suitable portion of the functionality of the management module 600 of FIG. 6 may be performed by the navigation controller 700 executing on an MDU.

In at least one embodiment, the execution planning module 702 may be configured to obtain and/or receive a task assignment and/or planned path information. The task assignment and/or planned path information may be generated by a component and/or device external to the navigation controller 700 (e.g., by the management module 600 of FIG. 6). In some embodiments, the execution planning module 702 may be configured to receive the task assignment and/or planned path information from the management module 600, or via another component and/or device such as the data store 524 of FIG. 5. The task assignment may correspond to various plannable activities (e.g., fetch an item, carry an item, store an item, etc.) to be performed by the MDUs of a workspace (e.g., the workspace 106 of FIG. 1). In some embodiments, the execution planning module 702 may be configured to receive planned path information (as part of the task assignment, or separately) that defines a planned path determined by the management module 600 (e.g., travel to location A at speed X, then travel to location B at speed Y, etc.).

In some embodiments, the execution planning module 702 may be configured to obtain a current location of a MDU (e.g., via navigation-related fiducial markers, using a GPS, utilizing image recognition techniques for identifying landmarks in an image of an area surrounding the MDU, etc.). The current location and state information (e.g., low battery, malfunction, systems good, etc.) may be reported to the management module 600 at any suitable time. The management module 600 may utilize such information for route planning and task assignment purposes.

In at least one embodiment, the space reservation module 704 may be configured to transmit a space reservation requests to the management module 600 in order to reserve space within the workspace (e.g., the workspace 106) needed for a particular MDU to perform an execution step. The space reservation module 704 may be configured to receive space reservation response indicating whether the reservation request was granted or denied. If the space reservation request is denied, the space reservation module 704 may be configured to resubmit a space reservation request at any suitable time, at a periodic rate, or the like until a space reservation response is received indicating that the request has been granted and, thus, the space has been reserved for the MDU. Subsequent to receiving a space reservation response that indicates the needed space has been reserved for an MDU, \

In at least one embodiment, the space reservation module 704 may be configured to receive location information identifying a location of an MDU and/or execution progress data indicating the execution state of the last instructions provided to the MDU. The location information and/or the execution progress data may be received directly from a component the MDU or from another source (e.g., a different MDU, a tracking system of the workspace 106, etc.). In some embodiments, the space reservation module 704 may determine from the location information and/or from the execution progress data that the MDU has completed or is about to complete an execution step. In some embodiments, the space reservation module 704 may request additional instructions and/or space reservations from the management system 600.

In some embodiments, the space reservation module 704 may be configured to indicate to the drive controller 706 that the space has been granted. Upon receipt, or at another suitable time, the drive controller 706 may identify a number execution steps to be performed by the MDU in accordance with the task assignment and/or planned path information. For example, execution steps may include at least one of: travelling in a particular direction, maintaining or modifying a speed of travel, performing a rotational motion (e.g., rotate clockwise 90 degrees), halting motion of the MDU, following another object (e.g., another MDU), collecting sensor data utilizing onboard sensors of the MDU, etc.

Figure 8:
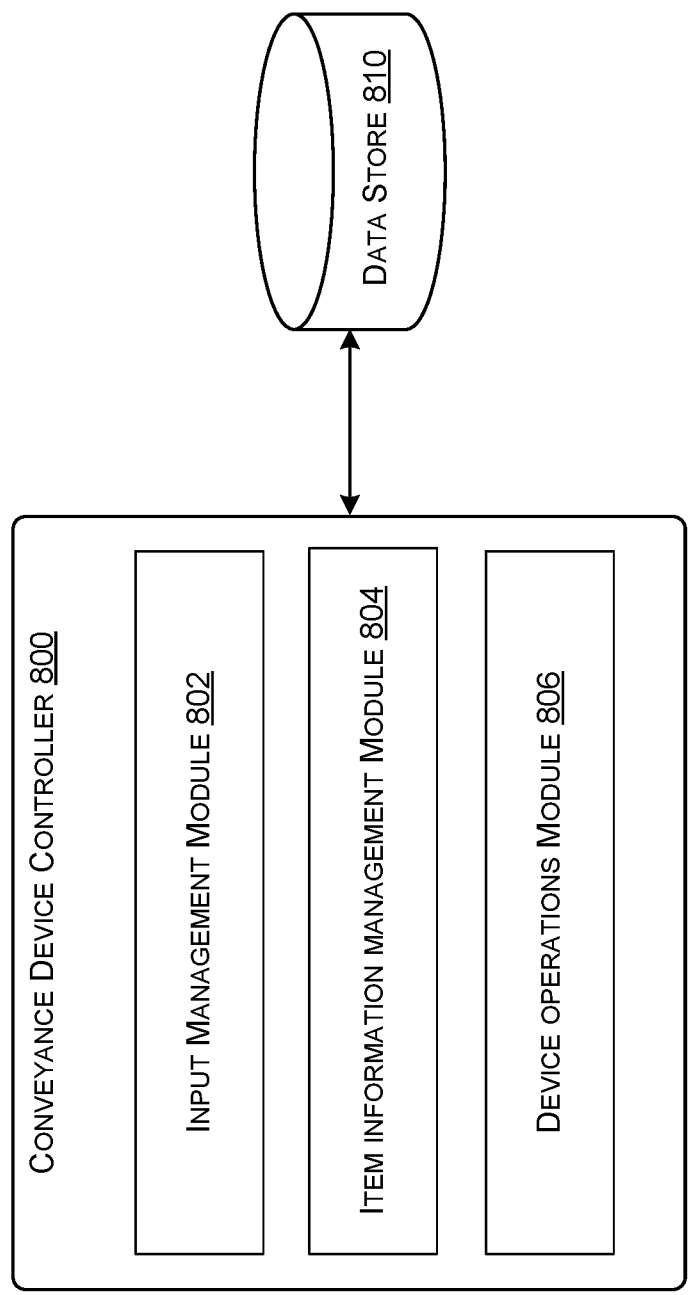
FIG. 8 illustrates in greater detail the components of an example conveyance device controller, in accordance with at least one embodiment.

FIG. 8 illustrates in greater detail an example conveyance device controller 800 (an example of the conveyance device controller 530 of FIG. 5), in accordance with at least one embodiment. The conveyance device controller 800 may execute on an MDU (e.g., the MDU 506 of FIG. 5). As shown, the example embodiment includes an input management module 802, an item information management module 804, and device operations module 806. The modules of FIG. 8 may be communicatively coupled to the data store 810 (e.g. the data store 538 of FIG. 5) such that data may be exchanged between the modules and the data store 810.

In at least one embodiment, the input management module 802 may be configured to obtain and/or receive conveyance information from one or more sensor(s) of the MDU (e.g., sensor(s) 212 of FIG. 2). In some embodiments, the conveyance information may be obtained from a conveyance-related fiducial marker as described above.

In some embodiments, conveyance-related fiducial markers may encode conveyance information via any suitable method (e.g., a location identifier encoded in a bar code, a QR code, MaxiCode, Data Matrix, EZ Code, or any suitable text and/or code may be employed, encoded or not. By way of example, conveyance information may include and suitable combination of the following: item information related to the item (e.g., weight, dimensions, material, etc.), shipping information (e.g., a shipping address, a zip code, etc.), a delivery location and/or a particular receptacle within the workspace, a specific location (e.g., a particular conveyance-related fiducial marker) at which to engage the conveyance device, a speed at which to engage the conveyance device, a duration for which the conveyance-related device is to be operated, an elevation to be achieved by the conveyance device, a distance between a conveyance-related fiducial marker and a delivery location or receptacle, an orientation of a particular receptacle with respect to a particular conveyance-related fiducial marker, an angle at which to tilt to the conveyance device, or any suitable instructions and/or information for operating a conveyance device to obtain and/or deliver at item. In some embodiments, the input management module 802 may be configured to store the conveyance information within the data store 810, a data store that is accessible to the conveyance device controller 800 and that is configured to store such information.

In some embodiments, the item information management module 804 may be configured to receive and/or obtain item information associated with an item to be and/or being conveyed by a conveyance device corresponding to the conveyance device controller 800. At least a portion of the item information may be obtained via the conveyance information received by the input management module 802 and/or stored by the data store 810. In some cases, an identifier of an item obtained via the conveyance information may be utilized by the item information management module 804 to query an item inventory (e.g., stored within data store 538 and/or 554 of FIG. 5 discussed below) for item information associated with the item. By way of example, the item information management module 804 may utilize an item identifier to query a data store (e.g., an inventory store of an online provider) and/or the management module 102 of FIG. 1 to determine item information (e.g., a shipping address, a destination receptacle within the workspace, item dimensions, weight, material of manufacture, etc.).

According to some embodiments, the item information management module 804 may obtain and/or receive the item information utilizing one or more sensors of the MDU (e.g., sensor(s) 214 of FIG. 2). For example, the sensor(s) 216 may be instructed by the item information management module 804 to collect sensor data from a shipping label, text, and/or by item images. In some embodiments, the item information may be ascertained by the item information management module 804 may analyzing the sensor data collected. By way of example, as the item is obtained and/or carried by the MDU 104, the item information management module 804 may utilize the sensor(s) 214 to determine a weight and/or orientation and/or dimensions of an item situated at/on the conveyance device. The sensor data may include weight measurements, accelerometer data, pressure data, and/or one or more images. As a non-limiting example, the sensor(s) 214 may be utilized to take a picture of an item just before the item is transferred to the MDU. By utilizing image recognition techniques, the item may be identified and/or dimensions of the item may be identified. Additionally, or alternatively, a shipping address and/or zip code may be identified from the images from a shipping label located on the item. Additional examples of item information collection utilizing the sensor(s) 214 are contemplated and may vary based on the attributes of the item and the type of sensor(s) 214 and capabilities of the MDU.

In some embodiments, the device operations module 806 may be configured to determine a set of operations to be performed by a conveyance device (e.g., a conveyor belt, a robotic arm, a tilt plane, etc.) mounted to an MDU. For example, the device operations module 806 may be configured to utilize conveyance information and/or item information obtained by the input management module 802 and/or the item information management module 804 to determine particular operations to be performed by a conveyance device in order to obtain/deliver an item from/to a receptacle. In some examples, the conveyance device controller 800 as a whole may operate independently from the navigation of the MDU on which it operates, while in other examples the device operations module 806 may be configured to send a speed and/or heading change request to the navigation controller 108 of FIG. 1 in order to modify a speed and/or heading of the MDU.

In some embodiments, the device operations module 806 may utilize the conveyance information obtained from conveyance-related fiducial markers to calculate a travelling speed of the MDU, although other sensor data (e.g., images, GPS information, etc.) may be utilized to calculate a travelling speed of the MDU. The calculated travelling speed and/or any suitable conveyance information can be used to calculate an appropriate speed, location, and manner in which to begin operating the conveyance device in order to obtain/deliver the item from/to a receptacle. Generally, any suitable parameter for operating a conveyance device may be calculated using any suitable combination of conveyance information and/or the item information.

In at least one embodiment, the device operations module 806 may be configured to operate the conveyance device corresponding to the conveyance device controller 800 in accordance with conveyance information and/or the item information obtained for the item. In other words, the operations of the conveyance device may vary based at least in part on the item and/or item attributes of the item being conveyed.

Figure 9:
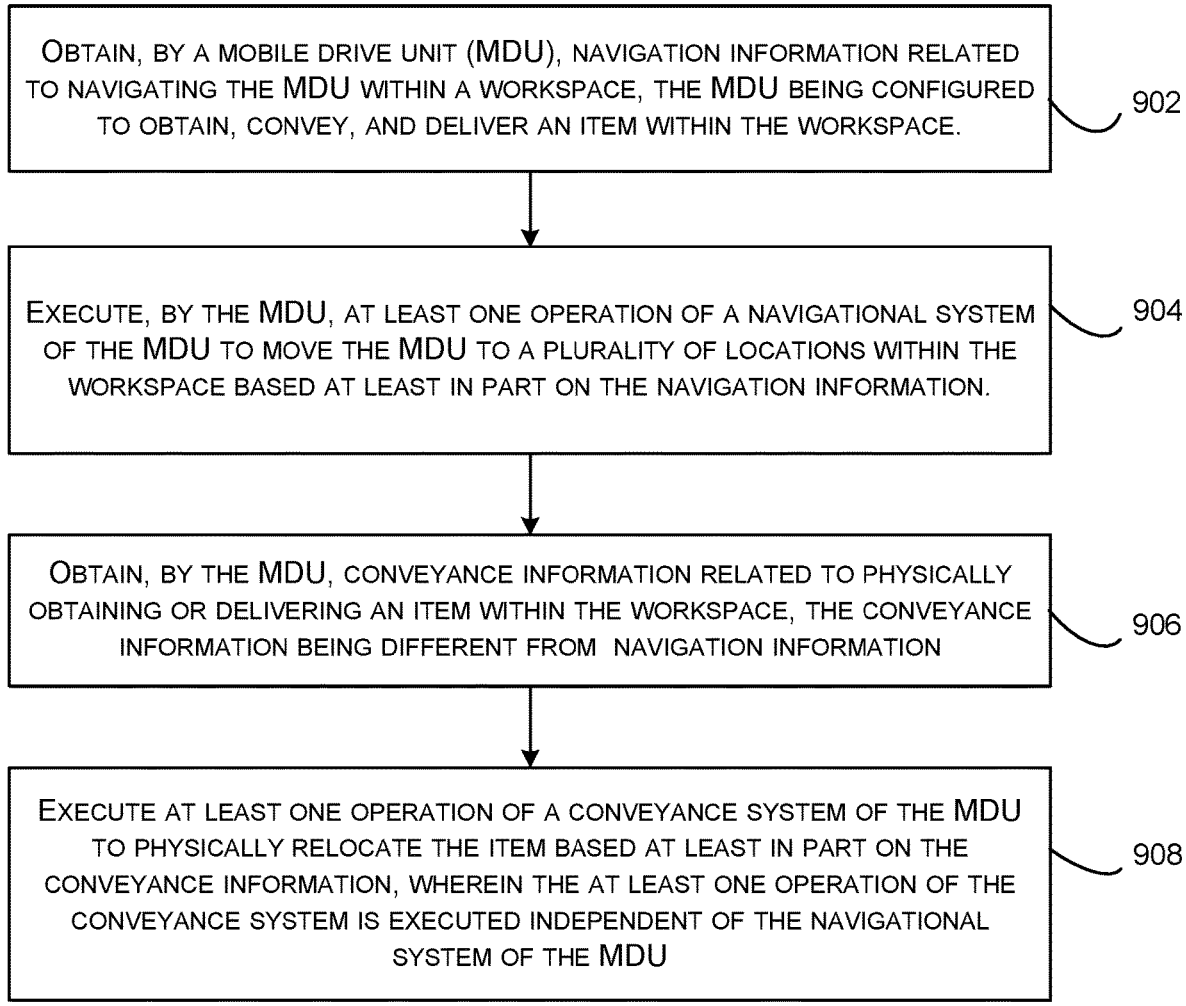
FIG. 9 is a flowchart illustrating an example method for controlling a conveyance device utilizing a conveyance device controller, in accordance with at least one embodiment.

FIG. 9 is a flowchart illustrating an example method 900 for providing item conveyance, in accordance with at least one embodiment. The method 900 may be performed by one or more components of the conveyance device controller 800 of FIG. 8. The method 900 may performed in any suitable order. It should be appreciated that the method 900 may include a greater number or a lesser number of steps than that depicted in FIG. 9.

The method may begin at 902, where navigation information related to navigating an MDU within a workspace is obtained (e.g., via an onboard guidance system 508 of FIG. 5). In some embodiments, the MDU may be configured to obtain, convey, and deliver an item (e.g., utilizing a conveyance device mounted to the MDU) within a workspace (e.g., a storage facility, a sortation facility where items may be sorted, for example, by zip code, etc.). The navigation information may be obtained by scanning or otherwise imaging a navigation-related fiducial marker within a workspace (e.g., the workspace 106 of FIG. 1). The navigation information may be obtained using any suitable system and/or sensor of the MDU including, but not limited to, scanners, bar code readers, cameras, GPS, etc.

At 904, at least one operation of a navigational system of the MDU may be executed (e.g., by the drive controller 706 of FIG. 7) to move the MDU to a plurality of locations within the workspace based at least in part on the navigation information. By way of example, the navigation information may identify a planned path for performing a task (e.g., item conveyance from one receptacle to another). The onboard guidance system 508 of FIG. 5 may be configured to determine and/or receive instructions to engage a drive module of the MDU to move about the workspace in accordance with the instructions. By executing these instructions with the drive module, the MDU may traverse the planned path.

At 906, conveyance information related to physically obtaining or delivering an item within the workspace may be obtained by the MDU (e.g., via the input management module 802 of FIG. 8, a component of the conveyance device controller 800). In at least one embodiment, the conveyance information is different from the navigation information. Conveyance information may be obtained by scanning or otherwise imaging a conveyance-related fiducial marker within a workspace (e.g., the workspace 106 of FIG. 1). The conveyance information may be obtained using any suitable system and/or sensor of the MDU including, but not limited to, scanners, bar code readers, cameras, GPS, etc. The conveyance information may include any suitable information for transferring an item to or from the MDU. By way of example, when an item is being transferred to the MDU, the conveyance information may include item information (e.g., an item identifier and/or a shipping address) and/or delivery location (e.g., a receptacle identifier). When the item is to be transferred from the MDU the conveyance information obtained from a conveyance-related fiducial marker may include an instruction to engage the conveyance device of the MDU.

At 908, at least one operation of a conveyance system of the MDU may be executed (e.g., by the device operations module 806 of FIG. 8, a component of the conveyance device controller 800) to physically relocate the item based at least in part on the conveyance information. In some embodiments, the at least one operation of the conveyance system is executed independent of the navigational system of the MDU. The at least one operation of the conveyance system could include operating a conveyor belt, tilt plane, and/or robotic arm in order to transfer an item to or from the MDU.

Figure 10:
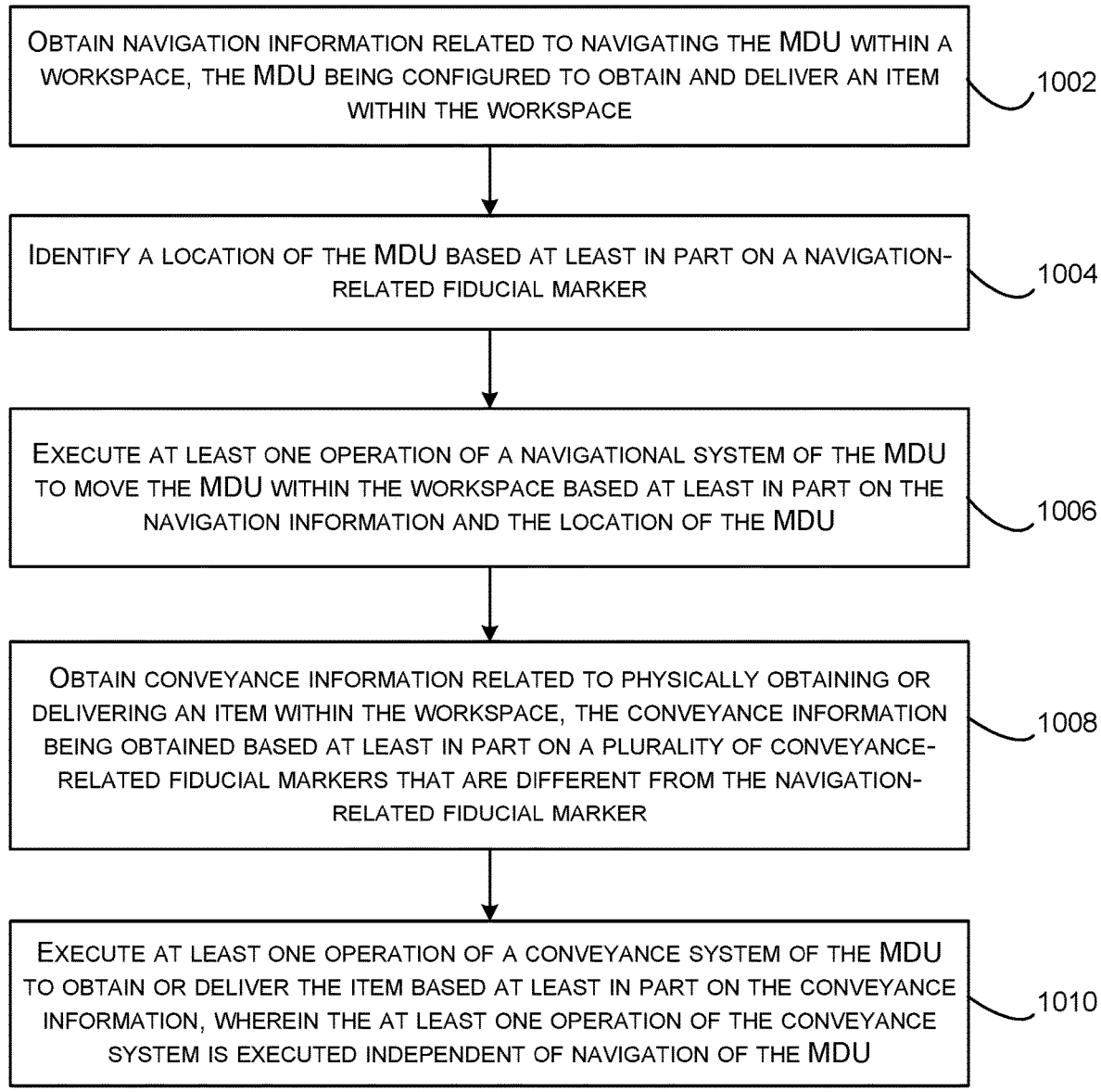
FIG. 10 is a flowchart illustrating another example method for controlling a conveyance device utilizing a conveyance device controller, in accordance with at least one embodiment.

FIG. 10 is a flowchart illustrating another example method 1000 for providing item conveyance, in accordance with at least one embodiment. The method 1000 may be performed by one or more components of the conveyance device controller 800 of FIG. 8. The method 1000 may performed in any suitable order. It should be appreciated that the method 1000 may include a greater number or a lesser number of steps than that depicted in FIG. 10. In some embodiments, a computer-readable storage medium may comprise computer-readable instructions that, upon execution by an MDU, configure the MDU to perform the method 1000. In some embodiments, the method 1000 may be performed by an MDU of the system 500.

The method 1000, may begin at 1002 where navigation information related to navigating the MDU within a workspace is obtained. In some examples, the MDU may be configured to obtain and deliver an item within the workspace. The MDU may have a conveyance device (e.g., a conveyor belt, a tilt plane, a robotic arm, etc.) mounted or otherwise attached to the MDU for conveying items (e.g., transferring items to and/or from the MDU). The navigation information may be obtained by scanning or otherwise imaging a navigation-related fiducial marker within a workspace (e.g., the workspace 106 of FIG. 1). The navigation information may be obtained using any suitable system and/or sensor of the MDU including, but not limited to, scanners, bar code readers, cameras, GPS, etc.

At 1004, a location of the MDU may be identified based at least in part on a navigation-related fiducial marker. By way of example, the navigation-related fiducial marker may provide a marker identifier and/or location information. The MDU and/or the management system (e.g., the management module 546 of FIG. 5) may utilize the marker identifier to determine a particular location or the location information may identify a particular location. The MDU may communicate the location to the management system and/or the management system may utilize the location to determine task assignments and/or route planning for the MDU.

At 1006, at least one operation of a navigational system of the MDU may be executed to move the MDU within the workspace based at least in part on the navigation information and the location of the MDU. By way of example, the navigation information may identify a planned path for performing a task (e.g., item conveyance from one receptacle to another). The onboard guidance system 508 of FIG. 5 may be configured to determine and/or receive instructions to engage a drive module of the MDU to move about the workspace in accordance with the instructions. By executing these instructions with the drive module, the MDU may traverse the planned path.

At 1008, conveyance information related to physically obtaining or delivering an item within the workspace may be obtained. The conveyance information may be obtained based at least in part on a plurality of conveyance-related fiducial markers that are different from the navigation-related fiducial marker. The conveyance information may be obtained using any suitable system and/or sensor of the MDU including, but not limited to, scanners, bar code readers, cameras, GPS, etc. The conveyance information may include any suitable information for transferring an item to or from the MDU. By way of example, when an item is being transferred to the MDU, the conveyance information may include item information (e.g., an item identifier and/or a shipping address) and/or delivery location (e.g., a receptacle identifier). When the item is to be transferred from the MDU the conveyance information obtained from a conveyance-related fiducial marker may include an instruction to engage the conveyance device of the MDU.

At 1010, at least one operation of a conveyance system of the MDU may be executed. In some examples, the at least one operation causes the MDU to obtain or deliver the item based at least in part on the conveyance information. In some examples, the at least one operation of the conveyance system is executed independent of navigation of the MDU. The at least one operation of the conveyance system could include operating a conveyor belt, tilt plane, and/or robotic arm in order to transfer an item to or from the MDU.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A mobile drive unit (MDU) configured for item conveyance within a workspace, the MDU comprising:
   a sensor mounted to the MDU;
   a guidance system configured to control motion of the MDU, the guidance system comprising a first processor and a first memory storing a first set of computer-readable instructions that, upon execution by the first processor, configured the guidance system to:
   obtain, utilizing the sensor, location information related to navigating within the workspace, the location information being obtained utilizing a first fiducial marker within the workspace; and
   navigate the MDU to a delivery location within the workspace according to the location information obtained utilizing the first fiducial marker; and
   a conveyance system configured to operate a conveyance device attached to the MDU, the conveyance system comprising a second processor; and
   a second memory storing a second set of computer-readable instructions that, upon execution by the second processor, configure the conveyance system to:
   receive, via the conveyance device, an item to be delivered to the delivery location within the workspace;
   obtain, utilizing the sensor, conveyance information related to operating the conveyance device, the conveyance information being obtained utilizing a second fiducial marker, the second fiducial marker being different from the first fiducial marker; and
   execute at least one operation of the conveyance device to deliver the item to the delivery location, the at least one operation of the conveyance system being executed based at least in part on the conveyance information obtained utilizing the second fiducial marker, and
   wherein the at least one operation of the conveyance system is executed independent of navigation of the MDU.

2. The MDU of claim 1, wherein the conveyance device comprises at least one of a conveyor belt, a robotic arm, or a tilt tray.

3. The MDU of claim 1, wherein the conveyance system operates independently from the guidance system.

4. The MDU of claim 1, wherein execution of the second set of computer-readable instructions further configures the conveyance system to calculate, using the conveyance information, a speed of approach and a relative distance and orientation with respect to the delivery location, wherein the at least one operation of the conveyance device being executed is further based at least in part on the speed of approach and the relative distance or orientation with respect to the delivery location.

5. The system of claim 1, wherein execution of the second set of computer-readable instructions further configures the conveyance system to determine device instructions for operating the conveyance device based at least in part on the conveyance information obtained from the second fiducial marker.

6. A computer-implemented method, comprising:
   obtaining, by a guidance system of a mobile drive unit (MDU), navigation information related to navigating the MDU within a workspace, the MDU being configured to obtain, convey, and deliver an item within the workspace;
   executing, by the guidance system, at least one operation to move the MDU to a plurality of locations within the workspace based at least in part on the navigation information;
   obtaining, by a conveyance system of the MDU, conveyance information related to physically obtaining or delivering the item within the workspace using a conveyance device attached to the MDU, the conveyance system being different from the guidance system; and
   executing, by the conveyance system, at least one operation of the conveyance device to physically relocate the item based at least in part on the conveyance information, wherein the at least one operation of the conveyance device is executed independent of navigating the MDU.

7. The computer-implemented method of claim 6, wherein executing the at least one operation of the conveyance system comprises obtaining the item at a first location within the workspace, and wherein executing the at least one operation of the conveyance system comprises delivering the item to a second location within the workspace.

8. The computer-implemented method of claim 6, wherein executing the at least one operation of the conveyance system is synchronized with execution of the at least one operation of the guidance system based at least in part on the conveyance information.

9. The computer-implemented method of claim 6, further comprising:
   obtaining, by the conveyance system, first conveyance information from a first conveyance-related fiducial marker;
   determining, by the conveyance system, a first distance from a delivery location of the item based at least in part on the first conveyance information;
   obtaining, by the conveyance system, second conveyance information from a second conveyance-related fiducial marker;
   determining, by the conveyance system, a second distance from the delivery location based at least in part on the second conveyance information; and calculating, by the conveyance system, a speed of the MDU based at least in part on the first distance and the second distance, wherein executing the at least on operation of the conveyance device is based at least in part on the speed calculated.

10. The computer-implemented method of claim 6, further comprising:
identifying, by the conveyance system, at least one of a weight or orientation of the item on a tilt plane of the conveyance device, wherein executing the at least one operation of the conveyance device is further based at least in part on at least one of the weight or the orientation of the item.

11. The computer-implemented method of claim 6, wherein the conveyance information comprises attributes of the item including at least one of: packaging dimensions of the item, a weight of the item, a material of the item, or a price of the item.

12. The computer-implemented method of claim 6, wherein the navigation information is obtained utilizing a navigation-related fiducial marker of the workspace.

13. The computer-implemented method of claim 12, wherein the conveyance information is obtained utilizing at least one conveyance-related fiducial marker of the workspace, the at least one conveyance-related fiducial marker being different from the navigation-related fiducial marker.

14. A computer-readable storage medium comprising computer-readable instructions that, upon execution by a mobile drive unit (MDU), configure the MDU to perform operations comprising:
obtaining, by a guidance system of the MDU from a remote system, navigation information related to navigating the MDU within a workspace, the MDU being configured to obtain and deliver an item within the workspace;
identifying, by the guidance system, a location of the MDU based at least in part on a navigation-related fiducial marker;
executing, by the guidance system, at least one operation to move the MDU within the workspace based at least in part on the navigation information and the location of the MDU;
obtaining, by a conveyance system of the MDU, conveyance information related to physically obtaining or delivering the item within the workspace using a conveyance device attached to the MDU, the conveyance information being obtained based at least in part on a plurality of conveyance-related fiducial markers that are different from the navigation-related fiducial marker; and
executing, by the conveyance system, at least one operation of the conveyance device to obtain or deliver the item based at least in part on the conveyance information, wherein the at least one operation of the conveyance device is executed independent of navigation of the MDU.

15. The computer-readable storage medium of claim 14, wherein the conveyance information obtained based at least in part on the plurality of conveyance-related fiducial markers identifies delivery instructions for delivering the item, wherein the delivery instructions comprise at least a delivery location for the item and instructions for operating the conveyance system to deliver the item.

16. The computer-readable storage medium of claim 14, wherein the plurality of conveyance-related fiducial markers are dynamically generated.

17. The computer-readable storage medium of claim 14, wherein the conveyance information comprises on-boarding instructions associated with loading the item onto the MDU or off-boarding instructions associated with transferring the item off of the MDU.

18. The computer-readable storage medium of claim 14, wherein the conveyance information identifies attributes of the item, and executing the at least one operation of the conveyance device is based at least in part on at least one attribute of the item.

19. The computer-readable storage medium of claim 14, wherein the conveyance device is mounted to the MDU and operates independently of motion of the MDU.

20. The computer-readable storage medium of claim 14, wherein the conveyance information identifies a relative orientation of a delivery location with respect to the MDU.

* * * * *